US010650618B2

(12) United States Patent
Li

(10) Patent No.: US 10,650,618 B2
(45) Date of Patent: May 12, 2020

(54) SYSTEMS AND METHODS FOR TRANSPORTATION SERVICE SAFETY ASSESSMENT

(71) Applicant: BEIJING DIDI INFINITY TECHNOLOGY AND DEVELOPMENT CO., LTD., Beijing (CN)

(72) Inventor: Bingye Li, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/233,195

(22) Filed: Dec. 27, 2018

(65) Prior Publication Data

US 2019/0130663 A1    May 2, 2019

Related U.S. Application Data

(63) Continuation of application No. PCT/CN2018/091435, filed on Jun. 15, 2018.

(30) Foreign Application Priority Data

Jun. 19, 2017  (CN) .......................... 2017 1 0467205

(51) Int. Cl.
*G07C 5/00* (2006.01)
*G06Q 10/08* (2012.01)
(Continued)

(52) U.S. Cl.
CPC ......... *G07C 5/008* (2013.01); *B60W 50/0098* (2013.01); *G06K 9/00832* (2013.01);
(Continued)

(58) Field of Classification Search
CPC ......... G06Q 10/06398; G06Q 30/0278; G06Q 10/08; G06Q 50/30; G08G 1/00;
(Continued)

(56) References Cited

U.S. PATENT DOCUMENTS

| | | | |
|---|---|---|---|
| 6,317,686 B1 | 11/2001 | Ran | |
| 9,940,651 B2 | 4/2018 | Ross et al. | |
| 2011/0153629 A1* | 6/2011 | Lehmann | ............... G06Q 10/06 707/758 |

(Continued)

FOREIGN PATENT DOCUMENTS

| | | |
|---|---|---|
| CN | 103646534 A | 3/2014 |
| CN | 107139868 A | 9/2017 |

(Continued)

OTHER PUBLICATIONS

International Search Report in PCT/CN2018/091435 dated Sep. 25, 2018, 4 pages.
Written Opinion in PCT/CN2018/091435 dated Sep. 25, 2018, 4 pages.

(Continued)

*Primary Examiner* — Hongmin Fan
(74) *Attorney, Agent, or Firm* — Metis IP LLC

(57) ABSTRACT

The present disclosure relates to systems and methods for assessing transportation service safety. The systems may receive transportation service data of a service order in an order time duration from one or more signal transmission devices relating to the service order; obtain, from a database, historical data relating to a driver of a vehicle of the service order, and one or more passengers of the service order; determine, a safety score of the service order at a current time point, based on the historical data, the transportation service data, and one or more characteristics of the service order; and determine whether a dangerous condition occurs at the current time based on the safety score.

20 Claims, 14 Drawing Sheets

(51) Int. Cl.

| | |
|---|---|
| *G06Q 50/30* | (2012.01) |
| *G06Q 30/02* | (2012.01) |
| *G08G 1/00* | (2006.01) |
| *G08G 1/01* | (2006.01) |
| *G06Q 10/06* | (2012.01) |
| *H04W 4/44* | (2018.01) |
| *B60W 50/00* | (2006.01) |
| *G06K 9/00* | (2006.01) |
| *G08B 25/10* | (2006.01) |

(52) U.S. Cl.
CPC ....... *G06Q 10/06398* (2013.01); *G06Q 10/08* (2013.01); *G06Q 30/0278* (2013.01); *G06Q 50/30* (2013.01); *G08B 25/10* (2013.01); *G08G 1/00* (2013.01); *G08G 1/01* (2013.01); *H04W 4/44* (2018.02)

(58) Field of Classification Search
CPC ...... G08G 1/01; H04W 4/44; B60W 50/0098; G06K 9/00832; G07C 5/008; G08B 25/10
See application file for complete search history.

(56) References Cited

U.S. PATENT DOCUMENTS

| | | |
|---|---|---|
| 2011/0213628 A1 | 9/2011 | Peak et al. |
| 2014/0074402 A1 | 3/2014 | Hassib et al. |
| 2016/0334797 A1 | 11/2016 | Ross et al. |
| 2017/0106876 A1 | 4/2017 | Gordon et al. |
| 2017/0200321 A1* | 7/2017 | Hummel ............ G06Q 30/0609 |
| 2018/0032928 A1 | 2/2018 | Li et al. |
| 2018/0308190 A1* | 10/2018 | Marco ................... G06Q 20/10 |

FOREIGN PATENT DOCUMENTS

| | | |
|---|---|---|
| EP | 2818830 A1 | 12/2014 |
| WO | 2018103313 A1 | 6/2018 |

OTHER PUBLICATIONS

Supplementary European Search Report in European Application No. 18819304.9 dated Feb. 19, 2019, 2 pages.
Search opinion of Extended European Search Report in European Application No. 18819304.9 dated Feb. 19, 2019, 4 pages.
First Office Action in Canadian Application No. 3029364 dated Nov. 8, 2019, 6 pages.

* cited by examiner

600

Obtaining a position of the driver signal transmission device, a position of at least one passenger signal transmission device, a start location of a service order and a destination of the service order  ⌁602

Determining that the service order starts in response to a determination that a driver and at least one passenger of the service order have reached the start location of the service order based on the position of the driver signal transmission device and the position of at least one passenger signal transmission device  ⌁604

┌─────────────────────────────────────────────────┐
│ Receiving transportation service data of a service order │─ 802
│ in an order time duration from one or more signal │
│ transmission devices relating to the service order │
└─────────────────────────────────────────────────┘
                        ↓
┌─────────────────────────────────────────────────┐
│ Obtaining, from a database, historical data relating to a │─ 804
│ driver of a vehicle of the service order, and one or more │
│ passengers of the service order │
└─────────────────────────────────────────────────┘
                        ↓
┌─────────────────────────────────────────────────┐
│ Determining, a safety score of the service order at a │─ 806
│ current time point, based on the historical data, the │
│ transportation service data, and one or more │
│ characteristics of the service order │
└─────────────────────────────────────────────────┘
                        ↓
┌─────────────────────────────────────────────────┐
│ Determining whether a dangerous condition occurs at │─ 808
│ the current time based on the safety score │
└─────────────────────────────────────────────────┘
                        ↓
┌─────────────────────────────────────────────────┐
│ Transmitting at least one signals to the at least one of │─ 810
│ the one or more signal transmission devices in │
│ response to a determination that a dangerous condition │
│ occurs │
└─────────────────────────────────────────────────┘

FIG. 8

SYSTEMS AND METHODS FOR TRANSPORTATION SERVICE SAFETY ASSESSMENT

CROSS-REFERENCE TO RELATED APPLICATIONS

This application is a Continuation of International Application No. PCT/CN2018/091435, filed on Jun. 15, 2018, which claims priority to Chinese Patent Application No. 201710467205.4, filed on Jun. 19, 2017. Each of the above-referenced applications is incorporated herein by reference in its entirety.

TECHNICAL FIELD

The present disclosure generally relates to systems and methods for online to offline service, and in particular, to systems and methods for assessing safety of online to offline service.

BACKGROUND

With the popularization of online to offline service, more and more people choose to use online to offline transportation service. Various dangerous situations may occur during a service, for example, drivers' dangerous driving behaviors, drivers' jeopardizing of passengers' personal safety or property safety, unexpected traffic accidents, robbery of drivers by the passenger, etc.

In order to actively monitor the safety of a service, at least one of the driver's physiological data and emotional data, vehicle driving data, in-vehicle image information, and/or voice recording may be collected in real time. Safety assessment may be performed based on the collected data to take the initiative to adopt safety mechanisms to protect the safety of both the drivers and the passengers. However, existing safety assessment program uses relatively simple data and does not comprehensively consider the impact of driver assessment data and passenger assessment data on safety. For example, factors like whether the drivers and the passengers having illegal records, passenger mobility and instability, historical safety scores, or one or more areas a route of the service passes through are not considered, which may result in a low effectiveness of safety assessment. Further, collecting the vehicle image information and/or voice recording and reporting to the server in real time may result in great power consumption and data exchange bandwidth requirement. Therefore, it is desirable to provide systems and methods for efficiently monitoring the safety of the service order.

SUMMARY

According to an aspect of the present disclosure, a system is provided. The system may include a computer-readable storage medium and at least one processor in communication with the computer-readable storage medium. The computer-readable storage medium may store executable instructions for assessing transportation service safety. When the at least one processor executes the executable instructions, the at least one processor may be directed to perform one or more of the following operations. The at least one processor may receive transportation service data of a service order in an order time duration from one or more signal transmission devices relating to the service order. The at least one processor may obtain, from a database, historical data relating to a driver of a vehicle of the service order, and one or more passengers of the service order. The at least one processor may determine, a safety score of the service order at a current time point, based on the historical data, the transportation service data, and one or more characteristics of the service order. The at least one processor may determine whether a dangerous condition occurs at the current time based on the safety score.

In some embodiments, the at least one processor may transmit a signal to at least one of the one or more signal transmission devices, the signal encoding an instruction to the at least one of the one or more signal transmission devices to transmit to the processor, data associated with a scene inside the vehicle, wherein the data including at least one type of video data, audio data, or image data. The at least one processor may receive the data associated with the scene in the vehicle from the at least one of the one or more signal transmission devices.

In some embodiments, the signal may be further encoded to instruct the at least one of the one or more signal transmission devices to retrieve the data associated with the scene in the vehicle from a media signal capture device inside the vehicle.

In some embodiments, the signal may be further encoded to activate the media signal capture device to capture the data associated with the scene in the vehicle in response to a determination that a dangerous condition occurs at the current time, and transmit the data associated with the scene in the vehicle to the at least one of the one or more signal transmission devices.

In some embodiments, in response to a determination that a dangerous condition occurs at the current time, the at least one processor may transmit a control signal to at least one of the one or more signal transmission devices to stop the motion of the vehicle.

In some embodiments, in response to a determination that a dangerous condition occurs at the current time, the at least one processor may transmit an alert signal to a third party requesting the third party to intervene.

In some embodiments, in response to a determination that a dangerous condition occurs at the current time, the at least one processor may transmit, based on a determination that the dangerous condition occurs with respect to the driver, a driver alert signal to the signal transmission device associated with the driver. Or, the at least one processor may transmit, based on a determination that the dangerous condition occurs with respect to the passenger, a passenger alert signal to at least one of the signal transmission devices associated with the one or more passengers.

In some embodiments, the at least one processor may receive the transportation service data from the one or more signal transmission devices every five seconds.

In some embodiments, the transportation service data may include at least one of: a plurality of time points during the service order; a plurality of positions of at least one of the one or more signal transmission devices corresponding to each of the plurality of time points; a driving record of the vehicle corresponding to the each of the plurality of time points, the driving record including acceleration data of the vehicle; and physiological data of at least one of the driver and the one or more passengers, the physiological data including at least one of heart rate, body temperature, or blood pressure.

In some embodiments, the one or more signal transmission devices may include at least one of: a driver signal transmission device configured to obtain the driving record, the physiological data of the driver, and the position of the driver signal transmission device from one or more first sensors associated with the driver; and at least one passenger signal transmission device configured to obtain the physiological data of the one or more passengers, and the position of the at least one passenger signal transmission device from one or more second sensors associated with the one or more passengers.

In some embodiments, the historical data relating to the driver may include at least one of a physical examination record of the driver, a medical record of the driver or historical transportation service data of the driver. The historical data relating to the one or more passengers may include at least one of a physical examination record of the one or more passengers, a medical record of the one or more passengers or historical transportation service data of the one or more passengers.

In some embodiments, the one or more characteristics of the service order may include at least one of: an estimated route of the service order; an actual route of the vehicle; an estimated middle duration of the service order; or a weather condition corresponding to the current time point. The estimated middle duration may correspond to an estimated time interval between a start time point that the one or more passengers get on the vehicle and an end time point that the one or more passengers get off the vehicle.

In some embodiments, the at least one processor may determine a meeting time point when a distance between a positon of the driver signal transmission device and a position of at least one passenger signal transmission device is less than a distance threshold in the pre-service duration. The at least one processor may designate the meeting time point as the start time point.

In some embodiments, the at least one processor may determine a driver safety score based on the historical data relating to the one or more passengers, the actual route, the estimated middle duration, and the current time point. The at least one processor may determine a passenger safety score based on the historical data relating to the driver, the estimated middle duration, and the current time point. The at least one processor may determine an abnormality score based on the transportation service data, and the one or more characteristics of the service order. The at least one processor may determine the safety score of the service order at a current time based on at least one of the driver safety score, the passenger safety score, or the abnormality score.

In some embodiments, the at least one processor may perform a first comparison between the driver safety score and a driver safety threshold. The at least one processor may perform a second comparison between the passenger safety score and a passenger safety threshold. The at least one processor may perform a third comparison between the abnormality score and an abnormality threshold. The at least one processor may determine the safety score of the service order at the current time based on at least one result of the first comparison, the second comparison, or the third comparison.

In some embodiments, the at least one processor may determine whether the dangerous condition occurs with respect to the driver based on at least one of the result of the first comparison and the third comparison. The at least one processor may determine whether the dangerous condition occurs with respect to the passenger based on at least one of the result of the second comparison and the third comparison.

In some embodiments, the at least one processor may determine a passenger assessment value based on at least one of the physical examination record of the one or more passengers, the medical record of the one or more passengers or the historical transportation service data of the one or more passengers. The at least one processor may determine one or more areas that the actual route passes through. The at least one processor may determine an area safety coefficient for at least one of the one or more areas. The at least one processor may determine a real time interval between the start time point and the current time point. The at least one processor may compare the real time interval with the estimated middle duration. The at least one processor may determine the driver safety score based on the passenger assessment value, the area safety coefficient, and a result of the comparison between the real time interval and the estimated middle duration.

In some embodiments, the at least one processor may determine a driver assessment value based on at least one of the physical examination record of the driver, the medical record of the driver or the historical transportation service data of the driver. The at least one processor may determine the passenger safety score based on the driver assessment value, and the result of the comparison between the real time interval and the estimated middle duration.

In some embodiments, the at least one processor may determine a vehicle abnormality assessment value based on the driving record, whether the vehicle deviates from the estimated route of the service order, and the one or more characteristics of the service order. The at least one processor may determine a driver abnormality assessment value based on at least one of the physiological data of the driver, and a post-service duration between the end time point and a time point that the driver accepts a request for a next service order. The at least one processor may determine a passenger abnormality assessment value based on the physiological data of the one or more passengers. The at least one processor may determine the abnormality score based on at least one of the vehicle abnormality assessment value, the driver abnormality assessment value, or the passenger abnormality assessment value.

In some embodiments, the at least one processor may perform a dangerous driving assessment based on the acceleration data of the vehicle. The at least one processor may determine the actual route of the vehicle based on the plurality of positions of at least one of the one or more signal transmission devices corresponding to each of the plurality of time points during the service order. The at least one processor may compare the actual route of the vehicle with the estimated route. The at least one processor may determine the vehicle abnormality assessment value based on the dangerous driving assessment, a result of the comparison between the actual route and the estimated route, and the weather condition corresponding to the current time point.

According to another aspect of the present disclosure, a method is provided. The method may be implemented on a computing device having at least one processor, at least one storage medium and a communication platform connected to a network. The method may include one or more of the following operations. The at least one processor may receive transportation service data of a service order in an order time duration from one or more signal transmission devices relating to the service order. The at least one processor may obtain, from a database, historical data relating to a driver of a vehicle of the service order, and one or more passengers of the service order. The at least one processor may determine, a safety score of the service order at a current time point, based on the historical data, the transportation service data, and one or more characteristics of the service order. The at least one processor may determine whether a dangerous condition occurs at the current time based on the safety score.

According to a further aspect of the present disclosure, a non-transitory computer readable medium is provided. The non-transitory computer readable medium may include a set of instructions for assessing transportation service safety. When the at least one processor executes the set of instructions, the at least one processor may be directed to perform one or more of the following operations. The at least one processor may receive transportation service data of a service order in an order time duration from one or more signal transmission devices relating to the service order. The at least one processor may obtain, from a database, historical data relating to a driver of a vehicle of the service order, and one or more passengers of the service order. The at least one processor may determine, a safety score of the service order at a current time point, based on the historical data, the transportation service data, and one or more characteristics of the service order. The at least one processor may determine whether a dangerous condition occurs at the current time based on the safety score.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for determining whether a transportation service starts according to some embodiments of the present disclosure;

FIG. 8 is a flowchart illustrating an exemplary process for assessing transportation service safety based on transportation service information and historical data according to some embodiments of the present disclosure;

DETAILED DESCRIPTION

Figure 1:
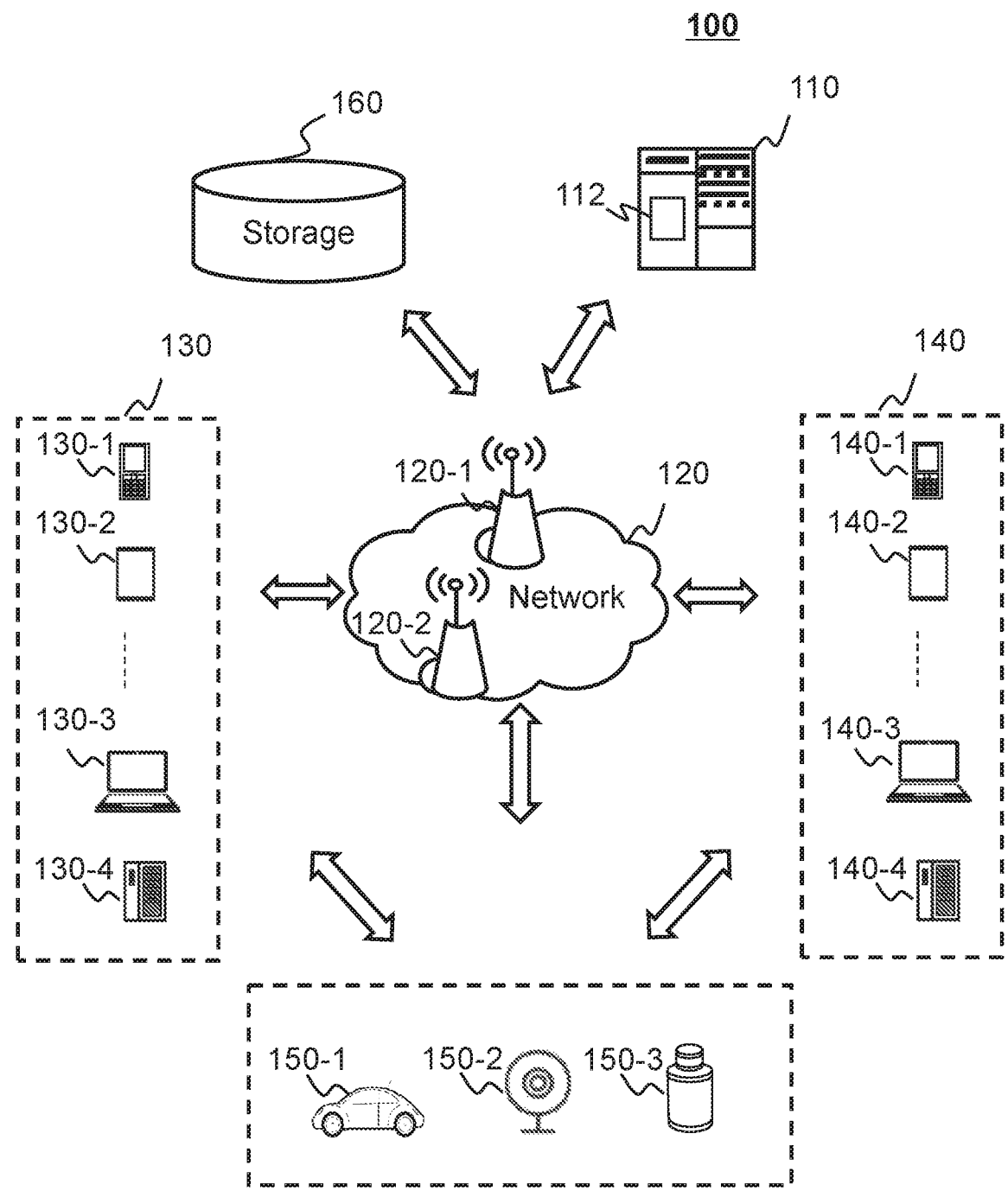
FIG. 1 is a schematic diagram illustrating an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding assessing safety of online to offline service, it should also be understood that this is only one exemplary embodiment. The system and method in the present disclosure may be applied to any application scenario which may assess online to offline service. For example, the system and method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, a bicycle, a tricycle, a motorcycle, or the like, or any combination thereof. The system and method of the present disclosure may be applied to taxi hailing, chauffeur services, delivery service, carpool, bus service, take-out service, driver hiring, vehicle hiring, bicycle sharing service, train service, subway service, shuttle services, location service, or the like, among others.

The terms "passenger," "requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "service order" in the present disclosure refers to a request that initiated by a passenger, a requester, a service requester, a customer, a driver, a provider, a service provider, a supplier, or the like, or any combination thereof, and accepted by any one of a passenger, a requester, a service requester, a customer, a driver, a provider, a service provider, or a supplier. The service order may be chargeable, or free.

An aspect of the present disclosure relates to systems and methods for assessing transportation service safety. To this end, a processor of the system may receive transportation service data of a service order in an order time duration from one or more signal transmission devices relating to the service order. The processor may obtain, from a database, historical data relating to a driver of a vehicle of the service order, and one or more passengers of the service order. The processor may then determine, a safety score of the service order at a current time point, based on the historical data, the transportation service data, and one or more characteristics of the service order. The processor may further determine whether a dangerous condition occurs at the current time based on the safety score.

It should be noted that the transportation service safety assessment, overall, is a technology deeply rooted in Internet world. In certain cases, receiving transportation service data of a service order periodically is not possible without the communications between terminal devices and a remote server. Therefore, the technical solution disclosed in the present disclosure is also a technology deeply rooted in Internet era.

FIG. 1 is a schematic diagram of an exemplary online to offline service system according to some embodiments of the present disclosure. For example, the online to offline service system 100 may be an online transportation service platform for transportation services such as taxi hailing, chauffeur services, delivery vehicles, carpool, bus service, driver hiring, and shuttle services. The online to offline service system 100 may be a platform including a server 110, a network 120, a requestor terminal 130, a provider terminal 140, a vehicle system 150, and a storage 160. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the storage 160 via the network 120. As another example, the server 110 may connect the requestor terminal 130, the provider terminal 140, and/or the storage 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service order to perform one or more functions described in the present disclosure. For example, the processing engine 112 may obtain transportation service data of a service order from one or more signal transmission devices and historical data from a database, and generate a safety score of the service order based on the transportation service data and the historical data. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the online to offline service system 100 (e.g., the server 110, the requestor terminal 130, the provider terminal 140, and the storage 160) may transmit information and/or data to other component(s) in the online to offline service system 100 via the network 120. For example, the server 110 may receive transportation service data of a service order from the requestor terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information between them.

In some embodiments, a requestor may be a user of the requestor terminal 130. In some embodiments, the user of the requestor terminal 130 may be someone other than the requestor. For example, a user A of the requestor terminal 130 may use the requestor terminal 130 to transmit a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, each of the requestor terminal 130 and/or the provider terminal 140 may be a device with a positioning system for locating the position of the provider and/or the provider terminal 140. In some embodiments, the requestor terminal 130 and/or the provider terminal 140 may periodically transmit location information to the server 110. In some embodiments, the requestor terminal 130 and/or the provider terminal 140 may communicate with another positioning device to determine the position of the requestor, the requestor terminal 130, the provider, and/or the provider terminal 140. In some embodiments, the requestor terminal 130 and/or the provider terminal 140 may transmit location information to the server 110.

In some embodiments, the positioning system may be a global positioning system (GPS), a global navigation satellite system (GLONASS), a compass navigation system (COMPASS), a BeiDou navigation satellite system, a Galileo positioning system, a quasi-zenith satellite system (QZSS), etc. The location information may be in the form of coordinates, such as, latitude coordinate and longitude coordinate, etc. The positioning system may include one or more satellites. The satellites may determine the location information mentioned above independently or jointly. The positioning system may send the information mentioned above to the network 120, or the requestor terminal 130 and/or the provider terminal 140 via wireless connections.

The vehicle system 150 may include a vehicle 150-1, a media signal capture device 150-2, and a plurality of sensors 150-3.

The vehicle 150-1 may be a non-autonomous vehicle, a semi-autonomous vehicle, an autonomous vehicle, or the like, or any combination thereof. In some embodiments, the vehicle 150-1 may include conventional structures of a non-autonomous vehicle, such as an engine, four wheels, a steering wheel, etc.

The media signal capture device 150-2 may be a video sensor. As used herein, a video sensor may refer to an apparatus for visual and/or audio recording. The video sensor may capture data relating to a scene inside the vehicle 150-1. The data may include a video, an image, an audio, or a combination thereof. As used herein, the term "video" may refer to motion pictures represented in analog and/or digital form. For examples, a video may include television signals, movies, image sequences from a camera or other observer, computer-generated image sequences, or the like, or a combination thereof. As used herein, a sequence (also referred to as a frame) may refer to a particular image or other discrete unit within a video. A video sensor may be implemented in a video camera. The video camera may include a color camera, a digital video camera, a camera, a camcorder, a PC camera, a webcam, an infrared (IR) video camera, a low-light video camera, a thermal video camera, a CCTV camera, a pan, a tilt, a zoom (PTZ) camera, a video sensing device, or the like, or a combination thereof.

The plurality of sensors 150-3 may be configured to provide information that is used to control the vehicle 150-1. In some embodiments, the sensors may sense status of the vehicle 150-1. The status of the vehicle may include mechanical situation of the vehicle, environmental information around the vehicle, or the like, or any combination thereof.

In some embodiments, the plurality of sensors 150-3 may be configured to sense mechanical situation of the vehicle 150-1. The plurality of sensors 150-3 may include a distance sensor, a velocity sensor, an acceleration sensor, a steering angle sensor, a traction-related sensor, a camera, and/or any sensor. For example, the distance sensor (e.g., a radar, a LiDAR, an infrared sensor) may determine a distance between a vehicle (e.g., the vehicle 150-1) and other objects (e.g., an obstacle). The distance sensor may also determine a distance between a vehicle (e.g., the vehicle 150-1) and one or more obstacles (e.g., static obstacles, motional obstacles). The velocity sensor (e.g., a Hall effect sensor) may determine a velocity (e.g., an instantaneous velocity, an average velocity) of a vehicle (e.g., the vehicle 150-1). The acceleration sensor (e.g., an accelerometer) may determine an acceleration (e.g., an instantaneous acceleration, an average acceleration) of a vehicle (e.g., the vehicle 150-1). The steering angle sensor (e.g., a tilt sensor or a micro gyroscope) may determine a steering angle of a vehicle (e.g., the vehicle 150-1). The traction-related sensor (e.g., a force sensor) may determine a traction of a vehicle (e.g., the vehicle 150-1).

In some embodiments, the plurality of sensors 150-3 may sense environment around the vehicle 150-1. For example, one or more sensors may detect a road geometry and obstacles (e.g., static obstacles, motional obstacles). The road geometry may include a road width, road length, road type (e.g., ring road, straight road, one-way road, two-way road). The static obstacles may include a building, tree, roadblock, or the like, or any combination thereof. The motional obstacles may include moving vehicles, pedestrians, and/or animals, or the like, or any combination thereof. The plurality of sensors 150-3 may include one or more video cameras, laser-sensing systems, infrared-sensing systems, acoustic-sensing systems, thermal-sensing systems, or the like, or any combination thereof.

In some embodiments, the vehicle 150-1 may also include a positioning system to obtain and/or determine the position of the vehicle 150-1. In some embodiments, the positioning system may also be connected to another party, such as a base station, another vehicle, or another person, to obtain the position of the party. For example, the positioning system may be able to establish a communication with a positioning system of another vehicle, and may receive the position of the other vehicle and determine the relative positions between the two vehicles.

The storage 160 may store data and/or instructions. In some embodiments, the storage 160 may store data obtained from the requestor terminal 130 and/or the provider terminal 140. In some embodiments, the storage 160 may store data and/or instructions that the server 110 may execute or use to perform exemplary methods described in the present disclosure. In some embodiments, the storage 160 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 160 may be connected to the network 120 to communicate with one or more components of the online to offline service system 100 (e.g., the server 110, the requestor terminal 130, the provider terminal 140). One or more components in the online to offline service system 100 may access the data or instructions stored in the storage 160 via the network 120. In some embodiments, the storage 160 may be directly connected to or communicate with one or more components in the online to offline service system 100 (e.g., the server 110, the requestor terminal 130, the provider terminal 140). In some embodiments, the storage 160 may be part of the server 110.

In some embodiments, one or more components of the online to offline service system 100 (e.g., the server 110, the requestor terminal 130, the provider terminal 140) may access the storage 160. In some embodiments, one or more components of the online to offline service system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components of the online to offline service system 100 may be achieved by way of requesting a service. The object of the service request may be any product. In some embodiments, the product may be a tangible product, or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), or the like, or any combination thereof.

One of ordinary skill in the art would understand that when an element of the online to offline service system 100 performs, the element may perform through electrical signals and/or electromagnetic signals. For example, when a requestor terminal 130 processes a task, such as making a determination, identifying or selecting an object, the requestor terminal 130 may operate logic circuits in its processor to process such task. When the requestor terminal 130 sends out a service request to the server 110, a processor of the service requestor terminal 130 may generate electrical signals encoding the service request. The processor of the requestor terminal 130 may then send the electrical signals to an output port. If the requestor terminal 130 communicates with the server 110 via a wired network, the output port may be physically connected to a cable, which may further transmit the electrical signals to an input port of the server 110. If the requestor terminal 130 communicates with the server 110 via a wireless network, the output port of the requestor terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 160), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
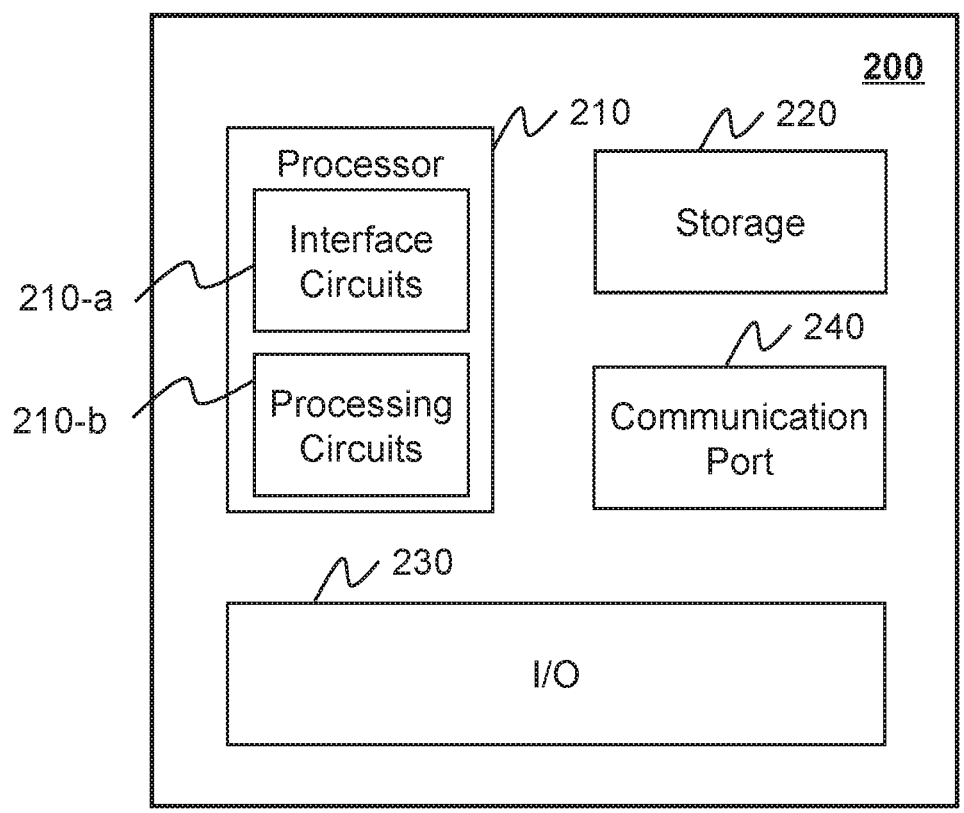
FIG. 2 is a schematic diagram illustrating exemplary hardware and/or software components of a computing device on which a processing engine may be implemented according to some embodiments of the present disclosure.

FIG. 2 is a schematic diagram illustrating exemplary hardware and/or software components of a computing device on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing engine 112 in accordance with techniques described herein. For example, the processor 210 may include interface circuits 210-a and processing circuits 210-b therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may process an input destination (e.g., a AOI) obtained from the requestor terminal 130, the provider terminal 140, the storage 160, and/or any other component of the online to offline service system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the requestor terminal 130, the provider terminal 140, the storage 160, and/or any other component of the online to offline service system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 112 for determining parent-child relationships.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112, the requestor terminal 130, the storage 160, or the provider terminal 140. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
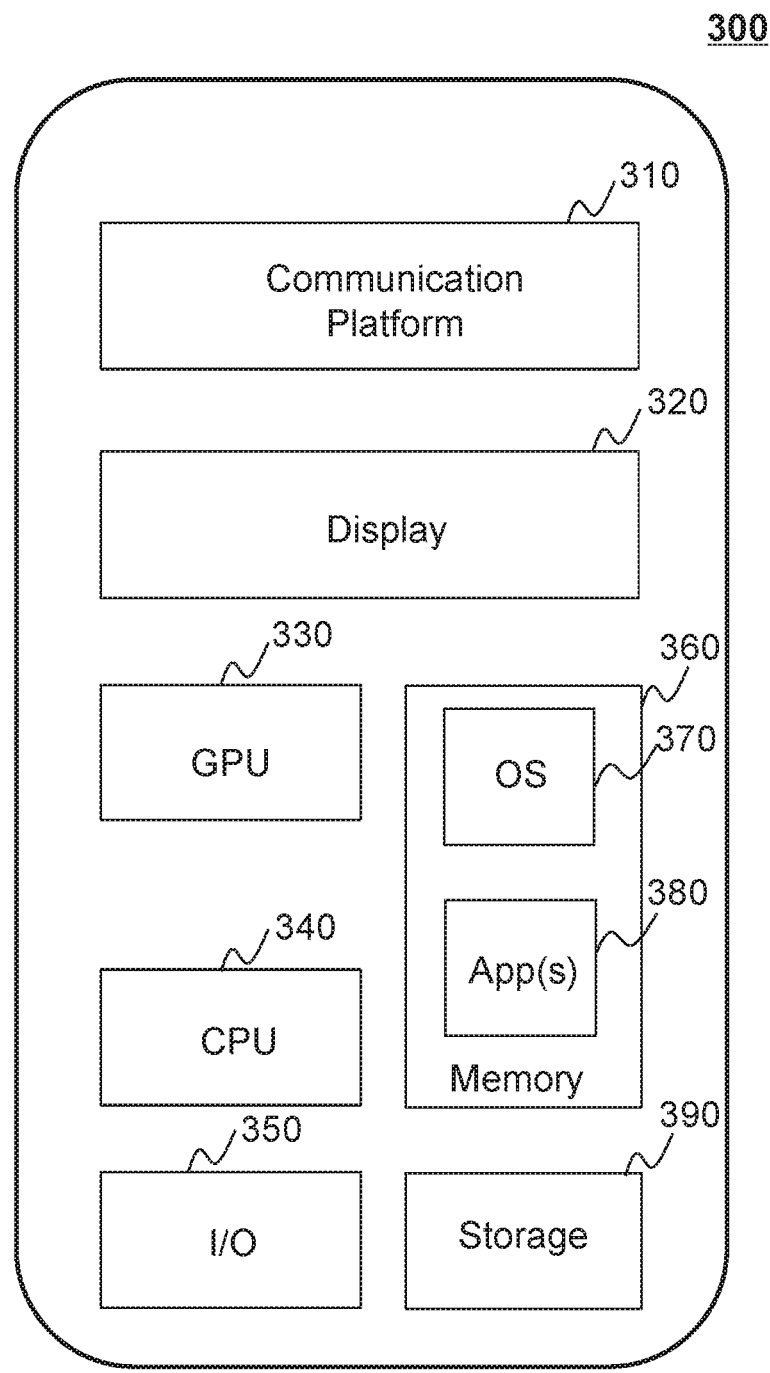
FIG. 3 is a schematic diagram illustrating exemplary hardware and/or software components of a mobile device on which a user terminal may be implemented according to some embodiments of the present disclosure.

FIG. 3 is a schematic diagram illustrating exemplary hardware and/or software components of a mobile device on which the requestor terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving an input destination or other information related to an on-demand service from the processing engine 112. User interactions with the information stream may be achieved via the I/O 350 and provided to the processing engine 112 and/or other components of the online to offline service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the online to offline service system 100 performs, the element may perform through electrical signals and/or electromagnetic signals. For example, when the processing engine 112 processes a task, such as making a determination, or identifying information, the processing engine 112 may operate logic circuits in its processor to process such task. When the processing engine 112 receives data (e.g., a first location name of a first POI) from the requestor terminal 130, a processor of the processing engine 112 may receive electrical signals including the data. The processor of the processing engine 112 may receive the electrical signals through an input port. If the requestor terminal 130 communicates with the processing engine 112 via a wired network, the input port may be physically connected to a cable. If the requestor terminal 130 communicates with the processing engine 112 via a wireless network, the input port of the processing engine 112 may be one or more antennas, which may convert the electrical signals to electromagnetic signals. Within an electronic device, such as the requestor terminal 130, and/or the server 110, when a processor thereof processes an instruction, sends out an instruction, and/or performs an action, the instruction and/or action is conducted via electrical signals. For example, when the processor retrieves or saves data from a storage medium (e.g., the storage device 160), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
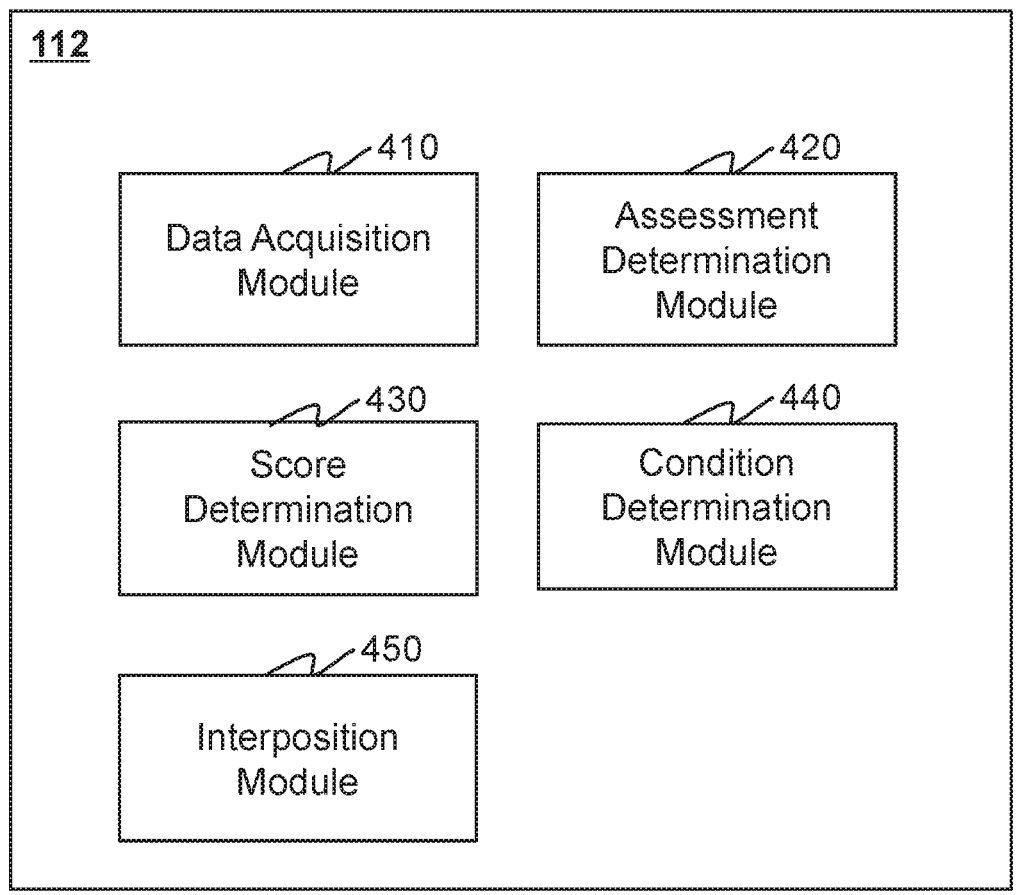
FIG. 4 is a schematic block diagram illustrating an exemplary processing engine according to some embodiments of the present disclosure.

FIG. 4 is a schematic block diagram illustrating an exemplary processing engine according to some embodiments of the present disclosure. The processing engine 112 may include a data acquisition module 410, an assessment determination module 420, a score determination module 430, a condition determination module 440, and an interposition module 450.

The data acquisition module 410 may receive transportation service data of a service order in an order time duration from one or more signal transmission devices relating to the service order, and obtain, from a database, historical data relating to a driver of a vehicle of the service order, and one or more passengers of the service order based on the transportation service information. In some embodiments, the data acquisition module 410 may receive the transportation service information from the one or more signal transmission devices or the storage device 160 via the network 120 periodically, in response to a determination that the transportation service starts. In some embodiments, the data acquisition module 410 may obtain the historical data associated with the transportation service from a storage device (e.g., the storage device 160) via the network 120.

The assessment determination module 420 may determine a plurality of assessment values used to determine a safety score of the service order. The plurality of assessment values may include a driver assessment value, a passenger assessment value, a vehicle abnormality assessment value, a driver abnormality assessment value, and a passenger abnormality assessment value. The assessment determination module 420 may determine the passenger assessment value based on at least one of a physical examination record of one or more passengers, a medical record of the one or more passengers, and historical transportation service data of the one or more passengers. The assessment determination module 420 may determine the driver assessment value based on at least one of a physical examination record of a driver, a medical record of the driver, and historical transportation service data of the driver. The assessment determination module 420 may determine the vehicle abnormality assessment value based on a driving record, whether the vehicle deviates from an estimated route of a service order, and one or more characteristics of the service order. The assessment determination module 420 may determine the driver abnormality assessment value based on at least one of the physiological data of the driver, and a post-service duration between an end time point and a time point that the driver accepts a request for a next service order. The assessment determination module 420 may determine the passenger abnormality assessment value based on the physiological data of the one or more passengers.

The score determination module 430 may determine the safety score of the service order at a current time point, based on the historical data, the transportation service data, and the one or more characteristics of the service order. The safety score may include a driver safety score, a passenger safety score, and an abnormality score. The score determination module 430 may determine the driver safety score based on historical data relating to one or more passengers, the one or more characteristics of the service order (e.g., an estimated route, an estimated middle duration), and the current time point. The score determination module 430 may determine the passenger safety score based on historical data relating to a driver, the estimated middle duration, and the current time point. The score determination module 430 may determine the abnormality score based on the transportation service data, and the one or more characteristics of the service order (e.g., weather condition).

The condition determination module 440 may determine whether a dangerous condition occurs at the current time point based on the safety score. In some embodiments, the condition determination module 440 may determine whether the dangerous condition occurs with respect to the driver based on at least one of a result of a first comparison related to the driver safety score and a third comparison related to the abnormality score. The condition determination module 440 may further determine whether the dangerous condition occurs with respect to the passenger based on at least one of a result of a second comparison related to the passenger safety score and the third comparison.

The interposition module 450 may transmit at least one signals to the at least one of the one or more signal transmission devices in response to a determination that a dangerous condition occurs. In some embodiments, the interposition module 450 may transmit a signal encoding an instruction to the at least one of the one or more signal transmission devices to transmit to the processor, data associated with a scene inside the vehicle, wherein the data including at least one type of video data, audio data, or image data. In some embodiments, when the vehicle is a semi-autonomous vehicle, or an autonomous vehicle, the interposition module 450 may transmit a control signal to at least one of the one or more signal transmission devices to stop the motion of the vehicle in response to a determination that a dangerous condition occurs with respect to the driver (e.g., a heart attack) at the current time point. In some embodiments, in response to a determination that a dangerous condition occurs at the current time point, the interposition module 450 may transmit an alert signal to a third party requesting the third party to intervene.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Part of the entirety of one or more of the modules may be omitted. Two or more of the modules may be combined into a single module, and any one of the modules may be divided into two or more sub-units. For example, the assessment determination module 420 and the score determination module 430 may be combined as a single module which may both determine the plurality of assessment values and determine the safety score based on the plurality of assessment values.

Figure 5:
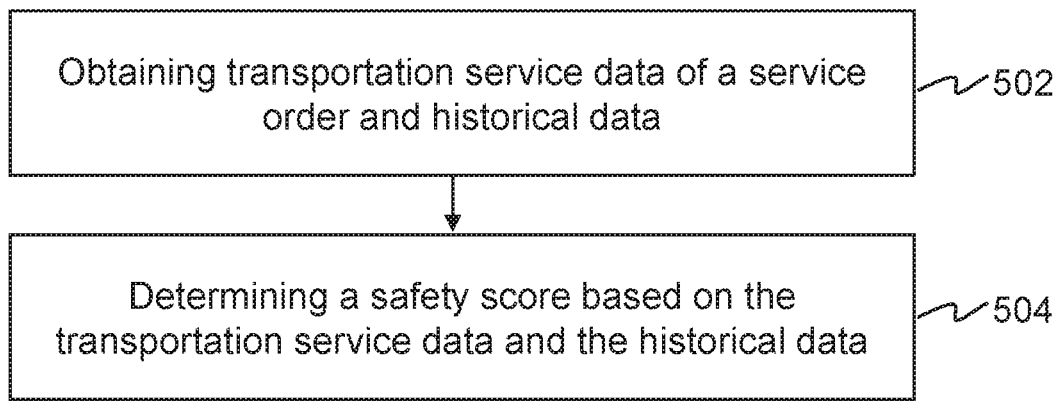
FIG. 5 is a flowchart illustrating an exemplary process for determining a plurality of safety scores according to some embodiments of the present disclosure.

FIG. 5 is a flowchart illustrating an exemplary process for determining a plurality of safety scores according to some embodiments of the present disclosure. The process 500 may be executed by the online to offline service system 100. For example, the process 500 may be implemented as a set of instructions (e.g., an application) stored in a storage device (e.g., the storage device 160). The processor 210 and/or the modules in FIG. 4 may execute the set of instructions and, when executing the instructions, the processor 210 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In some embodiments, as illustrated in FIG. 5, a transportation service safety assessment method is provided. In 502, in response to a determination that a service order starts, the processing engine 112 may obtain transportation service data of a service order and historical data; in 504, the processing engine 112 may determine a safety score for the service order based on the transportation service data and historical data.

In some embodiments, the processing engine 112 may determine a safety score of the service order based on the transportation service data of a service order and historical data. The processing engine 112 may be comprehensive and easy to be implemented, which may improve the validity and accuracy of the transportation service safety assessment. The processing engine 112 may detect and handle unsafe situations of the service order timely. The system of the present disclosure may be helpful for protecting the safety of drivers and passengers and improve user experience.

In some embodiments, the determining the safety score of the service order based on the transportation service data of the service order and historical data may include: analyzing a time difference between an estimated time of driving (also referred to as an estimated middle duration) and an actual time of driving (also referred to as a real time interval) and an area safety coefficient for at least one of one or more areas that an actual route of the service order passes through; analyzing and recording historical information relating to the driver of the service order in the historical data as historical data relating to the driver; analyzing and recording historical information relating to one or more passengers of the service order in the historical data as historical data relating to the one or more passengers; determining the safety score of the service order based on the time difference between the estimated time of driving and the actual time of driving, historical data relating to the driver, historical data relating to the one or more passengers and a preset safety score determination equation set.

In some embodiments, in response to a determination that the service order starts, the processing engine 112 may determine the safety score of the service order by determining the estimated time of driving and the actual time of driving, historical data relating to the driver, historical data relating to the one or more passengers according to equations in the preset safety score determination equation set. Expected technical effects may be obtained as following:

In response to a determination that violations occur during the service order, the processing engine 112 may determine the violations based on the safety score in real time (e.g., the safety score is lower than a safety threshold). A surveillance for the current service order may be activated. The activation of the surveillance may include auto-launching an image acquisition device and/or recording device (also referred to as a media signal capture device) inside the vehicle, or performing a manual interposition. The activation of the surveillance may further include determining whether the current service order is safe. On the one hand, health state of the driver and the one or more passenger, including physical health and mental health, may be confirmed using portable devices. On the other hand, whether at least one of the driver and the one or more passengers is involved in criminal records and/or bad driving records may be confirmed. For example, the safety threshold may be reduced to increase the intensity of the surveillance, in response to a determination that there is at least one criminal record and/or bad driving record related to the driver and the one or more passengers.

The processing engine 112 may timely and accurately notify the traffic department according to the safety score. The processing engine 112 may monitor an abnormality of the current service order and ask the police for help if necessary. For example, in response to a determination that the safety score is lower than the safety threshold, the processing engine 112 may send an alarm call or an alarm message automatically.

The processing engine 112 may determine the safety score based on a comprehensive consideration including an impact of driving data of the current service order on the service. The driving data of the current service order may include one or more areas that the actual route passes through, a driving speed, a driving time, a weather index during the driving process, a difference between the actual route and the actual route, etc. For example, the one or more areas that the estimated route passes through may be divided groups including very rural areas, rural areas, suburban areas outside the county, urban areas, and downtown areas. Safety thresholds may be reduced if the orders include the very rural areas and the rural areas, as violations are more likely to be happened in these two kinds of areas. For another example, safety thresholds may be reduced if the orders include areas with low visibility, as traffic accidents are more likely to happen in these areas. As still another example, the safety threshold may be reduced if the difference between the estimated route and the actual route is extremely large, which indicating that the vehicle may be hijacked. In this case, the safety threshold may be reduced to improve the accuracy and timeliness of the surveillance monitoring.

When the safety score is lower than the safety threshold, a corresponding surveillance and regulation may be triggered. Particularly, compared with the existing image acquisition solutions, the system of the present disclosure may timely and effectively monitor the safety of the service order without real-time image information and recording information. The system of the present disclosure may reduce power consumption, relieve data interaction pressure, and protect privacy of the one or more passengers.

For vehicles supporting Internet of Thing (IoT) control, when the safety score is lower than the safety threshold, the processing engine 112 may control the vehicle to brake, or park in a safe area. For another example, in response to a determination that the driver is determined to have a heart attack based on physiological data, the processing engine 112 may control the vehicle to stop in time.

In some embodiments, the historical data relating to the driver may include a physical examination record of the driver, a medical record of the driver, a real-time collection of somatic function data of the driver (subject to physiological data, including at least one of heartbeat data, pulse data, body temperature data), historical rating data, violation records, etc.

In some embodiments, the historical data relating to the one or more passengers may include a physical examination record of the one or more passengers, a medical record of the one or more passengers, a real-time collection of somatic function data of the one or more passengers (subject to physiological data, including at least one of heartbeat data, pulse data, body temperature data), historical rating data, violation records, etc.

In some embodiments, the preset safety score determination equation set may include a first equation and a second equation. The safety score of the service order includes a driver safety score determined based on the first equation and a passenger safety score determined based on the second equation. The first equation may be expressed as:

$$D = \frac{(PS + MS + \Delta T)}{3}. \quad (1)$$

The second equation may be expressed as:

$$p = \frac{(DS + \Delta T)}{2}. \quad (2)$$

In equations (1) and (2), D denotes the driver safety score, PS denotes the historical data relating to the one or more passengers, MS denotes the safety coefficient for at least one of one or more areas that an actual route of the service order passes through, $\Delta T$ denotes the time difference between the estimated time of driving and the actual time of driving, P denotes the passenger safety score, DS denotes the historical data relating to the driver.

The driver safety score may be determined using the first equation and the second equation. The historical data relating to the one or more passengers may reflect the impact of factors like violations of the one or more passengers. The safety coefficient for at least one of one or more areas that an actual route of the service order passes through may reflect the impact of factors like crime-prone areas and a rural degree of an area. The time difference between the estimated time of driving and the actual time of driving may reflect the impact of factors such as traffic conditions and accidents during the service order. The passenger safety score may be determined using the second equation. The historical data relating to the driver may reflect the impact of factors like violations of the driver. The time difference between the estimated time of driving and the actual time of driving may reflect the impact of factors such as traffic conditions and accidents during the service order. The comprehensive consideration of multiple factors may improve the effectiveness and accuracy of the safety score of the service order based on the driver safety score and the passenger safety score, thereby increasing the effectiveness and accuracy of transportation service safety assessment.

In some embodiments, the method may further include a third equation and a fourth equation. The third equation may be used to determine the historical data relating to the driver. The fourth equation may be used to determine the historical data relating to the one or more passengers.

The third equation may be exnressed as:

$$DS = \frac{\left(5 \times (1 - \alpha) + \frac{\beta}{20} + C\right)}{3}. \quad (3)$$

The fourth equation may be expressed as:

$$PS = \frac{(5 \times (1 - \emptyset) + \varphi + B)}{3}. \quad (4)$$

In equations (3) and (4), $\alpha$ denotes a complaint rate of the driver, $\beta$ denotes a service score the driver, C denotes a first preset parameter and is determined based on the number of the driver's orders γ, Ø denotes a complaint rate of the one or more passengers, φ denotes a score related to at least one of the one or more passengers, B denotes a second preset parameter and is determined based on the number of the one or more passengers' orders ω.

The historical data relating to the driver may be determined based on the third equation. The comprehensive consideration including multiple factors such as the complaint rate of the driver, the service score of the driver and the number of the driver's orders may increase the effectiveness of the historical data relating to the driver, thereby increasing the effectiveness of the safety score of the service order. The historical data relating to the one or more passengers may be determined based on the fourth equation. The comprehensive consideration including multiple factors such as the complaint rate of the one or more passengers and the number of the one or more passengers' orders may increase the effectiveness of the historical data relating to the one or more passengers, thereby increasing the effectiveness of the safety score of the service order.

In some embodiments, when the number of the driver's orders γ∈[0, 20), the value of the first preset parameter C is 1; when the number of the driver's orders γ∈[20, 50), the value of the first preset parameter C is 3; when the number of the driver's orders γ∈[50, 100), the value of the first preset parameter C is 4; and when the number of the driver's orders γ is greater than 100, the value of the first preset parameter C is 5.

In some embodiments, when the number of the one or more passengers' orders ω∈[0, 20), the value of the second preset parameter B is 1; when the number of the one or more passengers' orders ω ∈[20,50], the value of the second preset parameter B is 3; when the number of the one or more passengers' orders ω ∈ [50,100], the value of the second preset parameter B is 4; when the number of the one or more passengers' orders ω is greater than 100, the value of the second preset parameter B is 5.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 500. In the storing step, the processing engine 112 may store the safety score of the service order, the transportation service data of the service order, and the historical data relating to the service order in any storage device (e.g., the storage device 160) disclosed elsewhere in the present disclosure.

FIG. 6 is a flowchart illustrating an exemplary process for determining whether a transportation service starts according to some embodiments of the present disclosure. The process 600 may be executed by the online to offline service system 100. For example, the process 600 may be implemented as a set of instructions (e.g., an application) stored in a storage device (e.g., the storage device 160). The processor 210 and/or the modules in FIG. 4 may execute the set of instructions and, when executing the instructions, the processor 210 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

As illustrated in FIG. 6, in 602, the processing engine 112 may obtain a position of the driver signal transmission device, a position of at least one passenger signal transmission device, a start location of a service order and a destination of the service order. In 604, the processing engine 112 may determine that the service order starts in response to a determination that a driver and at least one passenger of the service order have reached the start location of the service order based on the position of the driver signal transmission device and the position of at least one passenger signal transmission device.

In some embodiments, the processing engine 112 may determine that the service order starts in response to a determination that a distance between the position of the driver signal transmission device and the position of at least one passenger signal transmission device is less than a distance threshold.

The combination of multiple factors such as the position of the driver signal transmission device, the position of at least one passenger signal transmission device, the start location of the service order, the destination of the service order may reduce the possibility of resource waste caused by assessments of cancelled service orders, and which may increase the accuracy of transportation safety assessment.

In some embodiments, the processing engine 112 may determine at least one of one or more areas that an actual route of the service order passes through and the actual time of driving based on the position of the driver signal transmission device.

In the present disclosure, the determining at least one of one or more areas that an actual route of the service order passes through and the actual time of driving based on the position of the driver signal transmission device may be easy to implement. The processing engine 112 may obtain the corresponding area safety coefficients based on the determined at least one of one or more areas. The processing engine 112 may obtain the time difference between the estimated time of driving and the actual time of driving based on the determined actual time of driving. Factors such as crime-prone areas, a rural degree of an area, a fatigue driving of a driver, traffic conditions, and accidents during the service order may be incorporated into the transportation service safety assessment.

The area safety coefficient may be determined based on regional historical violation records, driver's rating by passengers and relative geographical location rating. For example, scores related to area safety coefficients for areas with violation records are lower than scores related to area safety coefficients for areas without violation records. Taking relative geographical location rating as an example, scores related to area safety coefficients for geographically rural areas are lower than scores related to area safety coefficients for geographically urban areas. A 1 to 5 star rating system may be used to determine the driver's rating and the relative geographical location rating. Taking driver's rating as an example, the scores for each star level are as follows: 1 star if a violation happened or the vehicle may not have arrived safely; 2 stars if the driver complained and rated the one or more passengers with 1 star; 3 stars if the driver complained and rated the one or more passengers with 2 or 3 stars; 4 stars if the driver rated the one or more passengers with 4 stars; and 5 stars if the driver rated the one or more passengers with 5 stars. In addition, the star rating system may also be applied to the relative geographical location rating as follows: 1 star for extremely rural areas; 2 stars for rural areas; 3 stars for suburban areas outside the county; 4 stars for urban areas; 5 stars for downtown area. The area safety coefficient may be an average value of the above two star ratings.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 600. In the storing step, the processing engine 112 may store the start location of the service order, the area safety coefficients, and the star ratings in any storage device (e.g., the storage device 160) disclosed elsewhere in the present disclosure.

Figure 7:
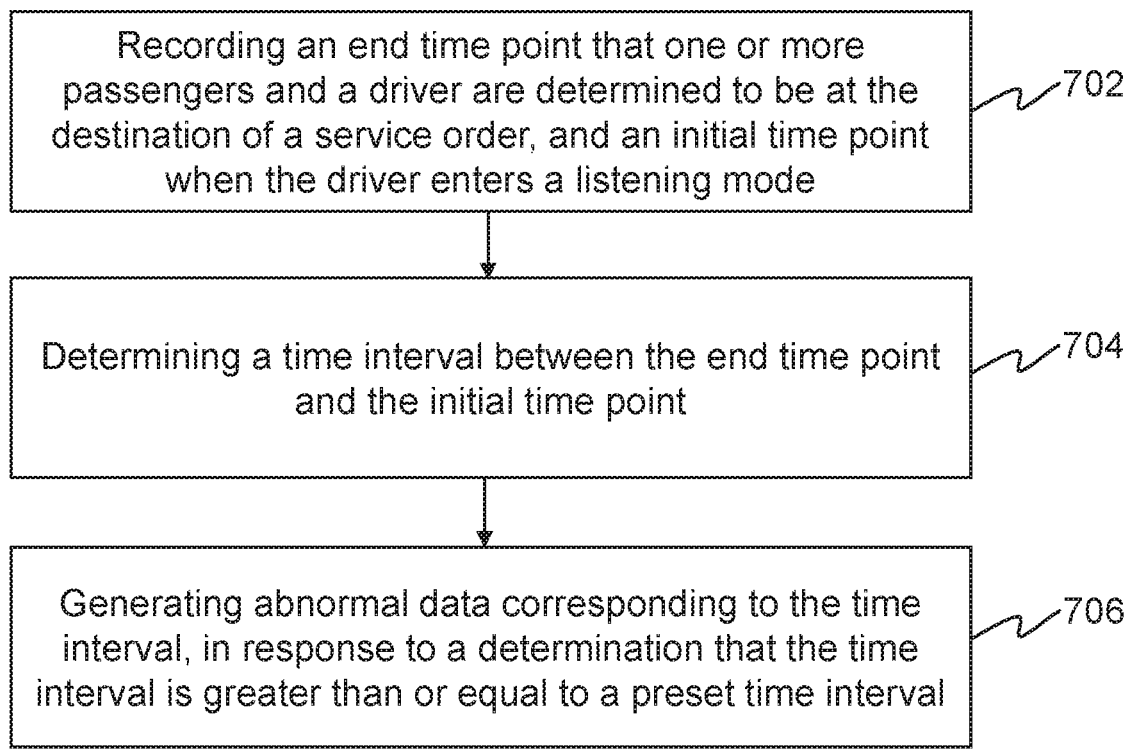
FIG. 7 is a flowchart illustrating an exemplary process for determining whether an abnormity happens according to some embodiments of the present disclosure.

FIG. 7 is a flowchart illustrating an exemplary process for determining whether an abnormity happens according to some embodiments of the present disclosure. The process 700 may be executed by the online to offline service system 100. For example, the process 700 may be implemented as a set of instructions (e.g., an application) stored in a storage device (e.g., the storage device 160). The processor 210 and/or the modules in FIG. 4 may execute the set of instructions and, when executing the instructions, the processor 210 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

As illustrated in FIG. 7, in 702, the processing engine 112 may determine an end time point in response to a determination that the one or more passengers and the driver are at the destination of a service order, based on a position of the driver signal transmission device and a position of at least one passenger signal transmission device, or based on a feedback indicating that the destination has been reached. The processing engine 112 may further determine an initial time point when the driver enters a listening list mode. In 704, the processing engine 112 may determine a time interval between the end time point and the initial time point. In 706, in response to a determination that the time interval is greater than or equal to a preset time interval, the processing engine 112 may generate abnormal data corresponding to the time interval. The abnormal data may be included in the safety score of the service order.

In the present disclosure, the determining an end time point in response to a determination that the one or more passengers and the driver are determined to be at the destination of a service order based on a position of the driver signal transmission device and a position of at least one passenger signal transmission device, or a feedback indicating that the destination has been reached, and an initial time point when the driver enters a listening list mode may improve the accuracy of the determined end time point and initial time point. The abnormal data corresponding to the time interval may be generated when the driver does not enter the listening list mode or the time interval between the end time point and the initial time point is too long. The abnormal data may be a portion of the safety score used to assess the safety of the service order, which may further improve the effectiveness of the transportation safety assessment. Dangerous condition after reaching the destination may be handled timely when emergency is likely to happen.

The listening list mode may indicate that the driver completes the service order, and is ready to accept an order request of a next service order. The next service order may be an active grabbed order or a passively allocated order. The next service order may be a real-time order or an appointment order.

Within a preset time interval after the vehicle reaches the destination, the position of the driver signal transmission device, the position of at least one passenger signal transmission device, and the position of the vehicle may be continuously collected to comprehensively determine that both the one or more passengers and the driver safely complete the service order.

In some embodiments, the method may further include: collecting image information of the service order and/or interposing with a manual customer service in response to a determination that at least one of the value of a driver safety score, the value of a passenger safety score, and the value of the abnormal data is lower than a corresponding preset threshold.

In the present disclosure, comparing each of the driver safety score, the passenger safety score, and/or the abnormal data with a corresponding preset threshold, collecting image information of the service order, the image information acting as a confirmation and forensic information to schedule a manual customer service interposition, and/or interposing with a manual customer service in response to a determination that at least one of the value of a driver safety score, the value of a passenger safety score, and the value of the abnormal data is lower than a corresponding preset threshold, may improve the accuracy and timeliness of the transportation safety assessment on one aspect. On the other aspect, collecting image information of the service order when at least one of the value of a driver safety score, the value of a passenger safety score, and the value of the abnormal data is lower than a corresponding preset threshold, may spare a collection and an uploading to the server in real time, thereby reducing power consumption and reducing data exchange pressure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 700. In the storing step, the processing engine 112 may store the end time point, the initial time point, and the time interval between the end time point and the initial time point may be determined in any storage device (e.g., the storage device 160) disclosed elsewhere in the present disclosure.

FIG. 8 is a flowchart illustrating an exemplary process for assessing transportation service safety based on transportation service information and historical data according to some embodiments of the present disclosure. The process 800 may be executed by the online to offline service system 100. For example, the process 800 may be implemented as a set of instructions (e.g., an application) stored in a storage device (e.g., the storage device 160). The processor 210 and/or the modules in FIG. 4 may execute the set of instructions and, when executing the instructions, the processor 210 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 802, the processing engine 112 (e.g., the data acquisition module 410) (e.g., the processing circuits 210-b of the processor 210) may receive transportation service data of a service order in an order time duration from one or more signal transmission devices relating to the service order.

The transportation service information may include a plurality of time points during the service order, a plurality of positions of at least one of the one or more signal transmission devices corresponding to each of the plurality of time points, and a driving record of the vehicle corresponding to the each of the plurality of time points. The driving record may include acceleration data of the vehicle, physiological data of at least one of the driver and the one or more passengers (e.g., heart rate, body temperature, blood pressure), a pick-up location, a service provider (also referred to as a driver), a requestor (also referred to as a passenger), an estimated time of arrival (ETA), or the like, or any combination thereof.

As used herein, the one or more signal transmission devices may include a driver signal transmission device configured to obtain the driving record, the physiological data of the driver, and the position of the driver signal transmission device from one or more first sensors associated with the driver. The one or more signal transmission devices may include at least one passenger signal transmission device configured to obtain the physiological data of the one or more passengers, and the position of the at least one passenger signal transmission device from one or more second sensors associated with the one or more passengers.

In some embodiments, the processing engine 112 (e.g., the data acquisition module 410) may receive the transportation service information from the one or more signal transmission devices or the storage device 160 via the network 120 periodically, in response to a determination that the transportation service starts. For example, the processing engine 112 may obtain transportation service information from the requestor terminal 130 and/or the provider terminal 140 every five seconds during a middle duration of the service order. Further, the processing engine 112 may store the transportation service information in a storage device (e.g., the storage device 160) disclosed elsewhere in the present disclosure.

As used herein, an order time duration may refer to a time interval between a time point that the driver accepts an order request of the service order and a time point that the driver accepts an order request of a next service order. The descriptions of exemplary order time duration may be found elsewhere in present disclosure (e.g., a pre-service duration, a middle duration, a post-service duration illustrated in FIG. 12, and the descriptions thereof).

Figure 12:
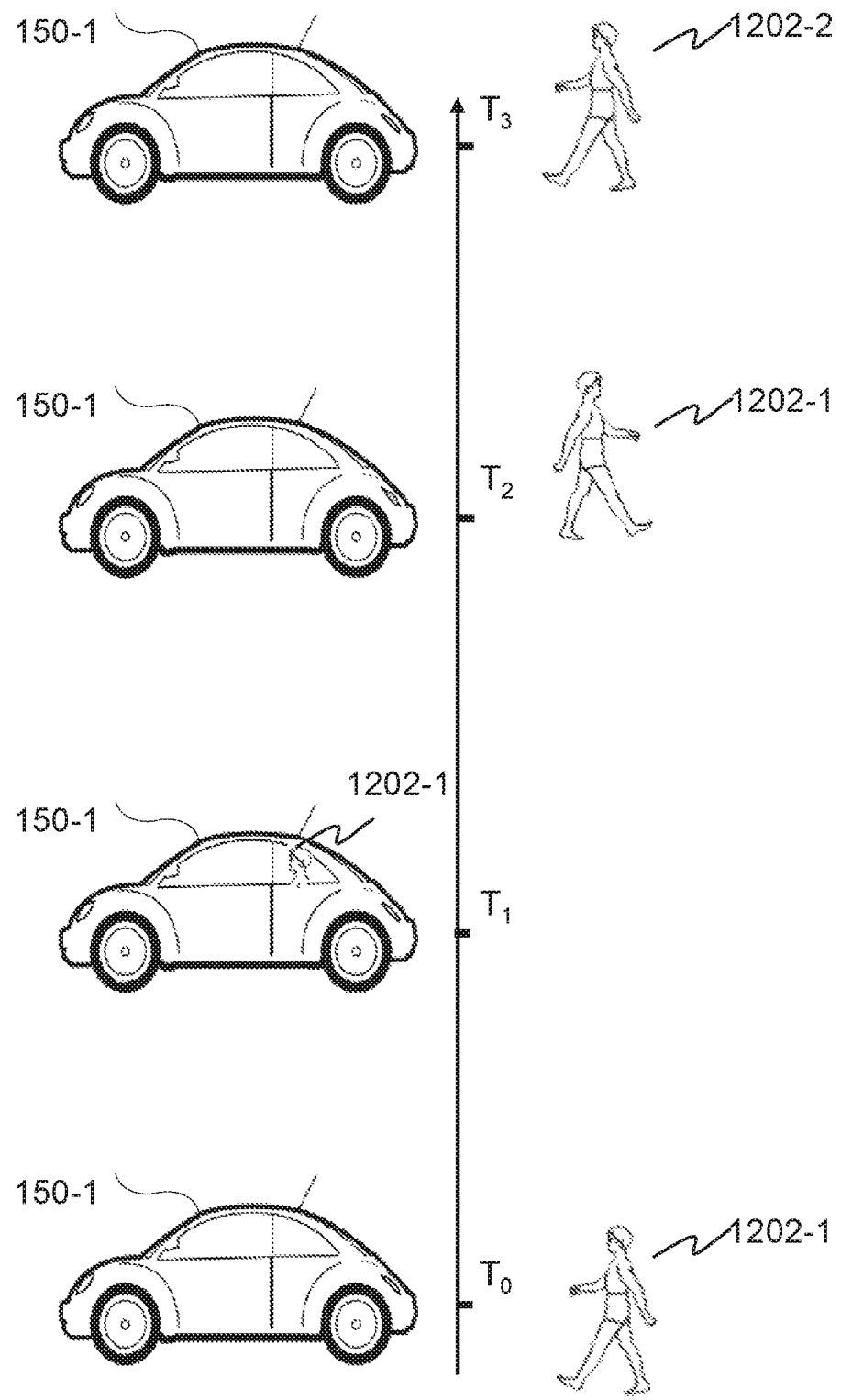
FIG. 12 is a schematic diagram illustrating an exemplary order time duration for a service order according to some embodiments of the present disclosure.

FIG. 12 is a schematic diagram illustrating an exemplary order time duration for a service order according to some embodiments of the present disclosure. As shown in FIG. 12, four time points may be representative time points for a service order. A time point $T_0$ may be a time point that the driver of the vehicle 150-1 accepts an order request of the service order. A time point $T_1$ may be a time point that the passenger 1202-1 gets on the vehicle 150-1. The time point $T_1$ may refer to as a start time point (also referred to as a meeting time point). In some embodiments, the processing engine 112 may determine that at least one passenger gets on the vehicle when a distance between a positon of the driver signal transmission device and a position of at least one passenger signal transmission device is less than a distance threshold in the pre-service duration. In some embodiments, the service order may include one or more passengers and the one or more passengers may get on the vehicle 150-1 at different time point. Thus, the time point $T_1$ may refer to a time point that the first passenger gets on the vehicle 150-1. A time point $T_2$ may be a time point that the passenger 1202-1 gets off the vehicle 150-1. In some embodiments, the service order may include one or more passengers and the one or more passengers may get off the vehicle 150-1 at different time points. Thus, the time point $T_2$ may refer to a time point that the last passenger gets off the vehicle 150-1. The time point $T_2$ may refer to as an end time point. A time point $T_3$ may be a time point that the driver of the vehicle 150-1 accepts an order request of a next service order requested by another passenger 1202-2.

A pre-service duration may correspond to a time interval between the time point $T_0$ and the time point $T_1$. A middle duration may correspond to a time interval between the time point $T_1$ and the time point $T_2$. A post-service duration may correspond to a time interval between the time point $T_2$ and the time point $T_3$.

Referring back to FIG. 8, in some embodiments, the processing engine 112 may determine that the transportation service starts when a distance between a position of a driver signal transmission device and a position of at least one passenger signal transmission device is less than a distance threshold in a pre-service duration of the service order.

In some embodiments, the driver signal transmission device may include the provider terminal 140. The passenger signal transmission device may include the requestor terminal 130. As described in connection with FIG. 1, the requestor terminal 130 and the provider terminal 140 may be devices with positioning technology for locating the positions of the requestor terminal 130 and the provider terminal 140. The requestor terminal 130 and the provider terminal 140 may further send the position to the server 110.

In some embodiments, the processing engine 112 may determine that the transportation service starts when the driver and at least one of the one or more passengers both reach the pick-up location of the service order based on the pick-up location, the position of a driver signal transmission device and the position of at least one passenger signal transmission device.

The pick-up location of the transportation service may be determined by the service provider, the requestor, the server 110, or the like, or any combination thereof. For example, the requestor may initiate a transportation request by entering a pick-up location and/or a destination in a transportation service providing application (e.g., Didi App) installed in his/her mobile phone. For another example, the requestor may initiate a transportation request by entering a destination in a transportation service providing application (e.g., Didi App) installed in his/her mobile phone. The location of the requestor may be send to the server 110 and determined as the pick-up location of the transportation service by the server 110. As still another example, the requestor may initiate a transportation request by confirming a pick-up location and/or a destination in a transportation service providing application (e.g., Didi App) installed in his/her mobile phone. The pick-up location and/or the destination may be determined by the server 110.

In 804, the processing engine 112 (e.g., the data acquisition module 410) (e.g., the processing circuits 210-*b* of the processor 210) may obtain, from a database, historical data relating to a driver of a vehicle of the service order, and one or more passengers of the service order.

The processing engine 112 may obtain the historical data associated with the transportation service from a storage device (e.g., the storage device 160) via the network 120. The processing engine 112 (e.g., the data acquisition module 410) may obtain the historical data associated with the transportation service based on the transportation service information. For example, the processing engine 112 may obtain historical data associated with the service provider of the transportation service based on information of the service provider in the transportation service information. For another example, the processing engine 112 may obtain historical data associated with the requestor of the transportation service based on information of the service requestor in the transportation service information.

The historical data relating to the driver may include at least one of a physical examination record of the driver, a medical record of the driver, and historical transportation service data of the driver. The historical data relating to the one or more passengers includes at least one of a physical examination record of the one or more passengers, a medical record of the one or more passengers, and historical transportation service data of the one or more passengers.

In 806, the processing engine 112 (e.g., the score determination module 430) (e.g., the processing circuits 210-*b* of the processor 210) may determine a safety score of the service order at a current time point, based on the historical data, the transportation service data, and one or more characteristics of the service order.

In some embodiments, the one or more characteristics of the service order may include an estimated route of the service order, an actual route of the vehicle, an estimated middle duration of the service order, a weather condition corresponding to the current time point, or the like, or any combination thereof. The estimated middle duration corresponds to an estimated time interval between a start time point that the one or more passengers get on the vehicle and an end time point that the one or more passengers get off the vehicle.

The safety score of the service order may include a driver safety score, a passenger safety score, and an abnormality score. The processing engine 112 may perform a first comparison between the driver safety score and a driver safety threshold. The processing engine 112 may perform a second comparison between the passenger safety score and a passenger safety threshold. The processing engine 112 may perform a third comparison between the abnormality score and an abnormality threshold. The processing engine 112 may determine the safety score of the service order at the current time based on at least one result of the first comparison, the second comparison, or the third comparison. Detailed descriptions regarding the safety score of the service order may be found elsewhere in the present disclosure (e.g., in FIG. 9, and the descriptions thereof).

In 808, the processing engine 112 (e.g., the condition determination module 440) (e.g., the processing circuits 210-*b* of the processor 210) may determine whether a dangerous condition occurs at the current time based on the safety score. In some embodiments, the processing engine 112 may determine whether the dangerous condition occurs with respect to the driver based on at least one of a result of the first comparison and the third comparison. The processing engine 112 may further determine whether the dangerous condition occurs with respect to the passenger based on at least one of a result of the second comparison and the third comparison. For example, the processing engine 112 may determine that the dangerous condition occurs with respect to the driver, in response to a determination that the driver safety score is lower than the driver safety threshold and/or the abnormality score is lower than the abnormality threshold. For another example, the processing engine 112 may determine that the dangerous condition occurs with respect to the passenger, in response to a determination that the passenger safety score is lower than the passenger safety threshold and/or the abnormality score is lower than the abnormality threshold.

In 810, the processing engine 112 (e.g., the interposition module 450) (e.g., the processing circuits 210-*b* of the processor 210) may transmit at least one signals to the at least one of the one or more signal transmission devices in response to a determination that a dangerous condition occurs. In some embodiments, the processing engine 112 may transmit a signal encoding an instruction to the at least one of the one or more signal transmission devices requesting to receive data associated with a scene inside the vehicle, wherein the data including at least one type of video data, audio data, or image data. For example, the signal may be further encoded to instruct the at least one of the one or more signal transmission devices to retrieve the data associated with the scene in the vehicle from a media signal capture device inside the vehicle. For another example, the signal may be further encoded to activate the media signal capture device to capture the data associated with the scene in the vehicle in response to a determination that a dangerous condition occurs at the current time, and transmit the data associated with the scene in the vehicle to the at least one of the one or more signal transmission devices. The processing engine 112 may then receive the data associated with the scene in the vehicle from the at least one of the one or more signal transmission devices and store the data in the storage device 160 for further application (e.g., forensic evidence).

In some embodiments, when the vehicle is a semi-autonomous vehicle, or an autonomous vehicle, the processing engine 112 may transmit a control signal to at least one of the one or more signal transmission devices (e.g., a control unit of the plurality of sensors 150-3) to stop the motion of the vehicle in response to a determination that a dangerous condition occurs with respect to the driver (e.g., a heart attack) at the current time point. Detailed descriptions regarding the stopping the vehicle may be found elsewhere in the present disclosure (e.g., FIG. 14, and the descriptions thereof).

In some embodiments, in response to a determination that a dangerous condition occurs at the current time, the processing engine 112 may transmit an alert signal to a third party requesting the third party to intervene. For example, when it is determined that the dangerous condition occurs with respect to the driver or the passenger, the processing engine 112 may transmit an alert signal to a police department and/or a transportation department and ask them to intervene. The police department and/or the transportation department may take actions like dispatching policeman to check the vehicle on site or block the road that the vehicle will pass through.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 800. In the storing operation, the processing engine 112 may store security score, the historical data, the transportation service information in any storage device (e.g., the storage device 160) disclosed elsewhere in the present disclosure.

Figure 9:
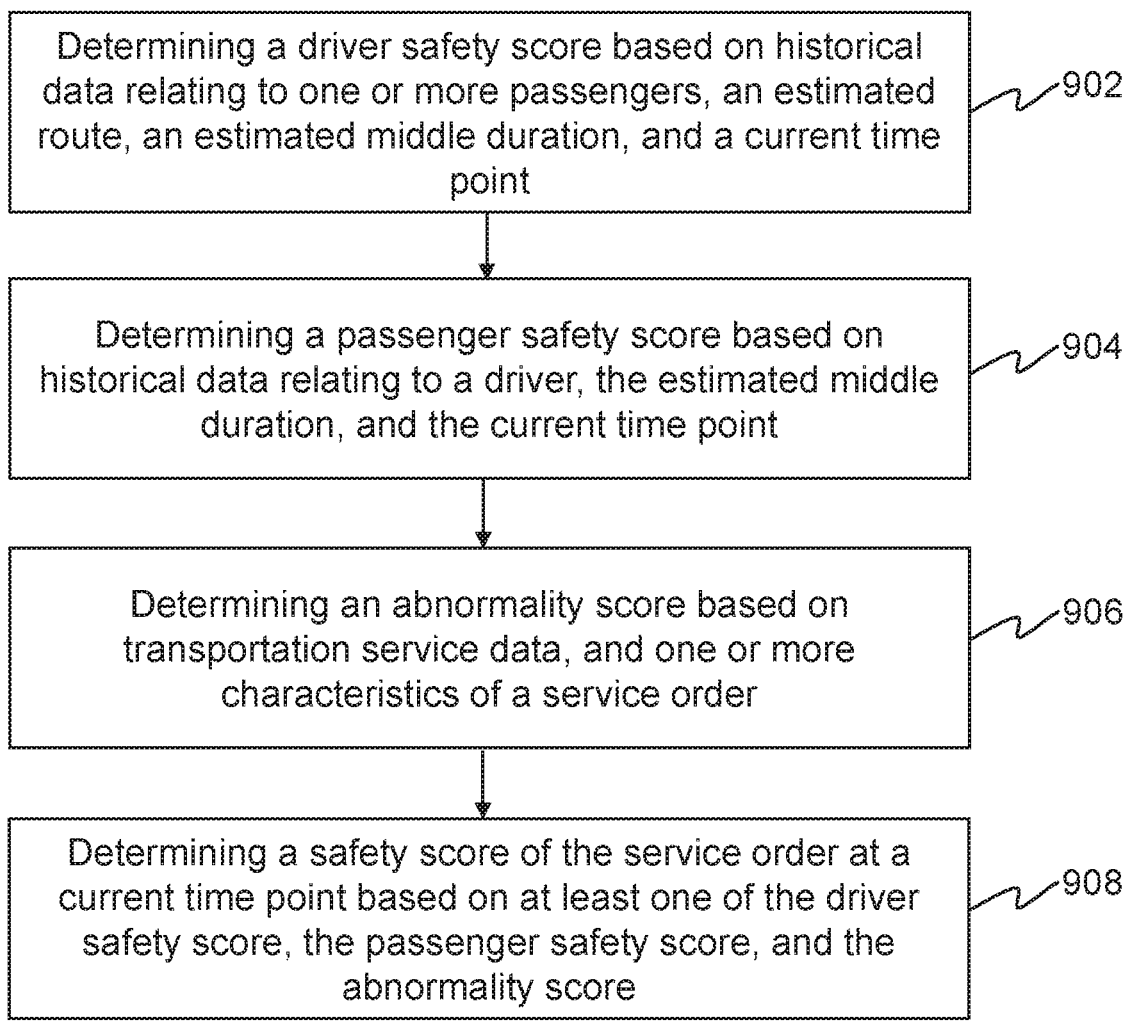
FIG. 9 is a flowchart illustrating an exemplary process for determining a safety score according to some embodiments of the present disclosure.

FIG. 9 is a flowchart illustrating an exemplary process for determining a safety score according to some embodiments of the present disclosure. In some embodiments, operation 806 of process 800 may be performed based on the process 900. The process 900 may be executed by the online to offline service system 100. For example, the process 900 may be implemented as a set of instructions (e.g., an application) stored in a storage device (e.g., the storage device 160). The processor 210 and/or the modules in FIG. 4 may execute the set of instructions and, when executing the instructions, the processor 210 and/or the modules may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 902, the processing engine 112 (e.g., the score determination module 430) (e.g., the processing circuits 210-*b* of the processor 210) may determine a driver safety score based on historical data relating to one or more passengers, an actual route, an estimated middle duration, and a current time point. Detailed descriptions regarding the driver safety score may be found elsewhere in the present disclosure (e.g., FIG. 10, and the descriptions thereof).

In 904, the processing engine 112 (e.g., the score determination module 430) (e.g., the processing circuits 210-*b* of the processor 210) may determine a passenger safety score based on historical data relating to a driver, the estimated middle duration, and the current time point. Detailed descriptions regarding the passenger safety score may be found elsewhere in the present disclosure (e.g., FIG. 10, and the descriptions thereof).

In 906, the processing engine 112 (e.g., the score determination module 430) (e.g., the processing circuits 210-*b* of the processor 210) may determine an abnormality score based on transportation service data, and one or more characteristics of the service order. Detailed descriptions regarding the abnormality score may be found elsewhere in the present disclosure (e.g., FIG. 11, and the descriptions thereof).

In 908, the processing engine 112 (e.g., the score determination module 430) (e.g., the processing circuits 210-*b* of the processor 210) may determine a safety score of the service order at a current time point based on at least one of the driver safety score, the passenger safety score, and the abnormality score.

The processing engine 112 may perform a first comparison between the driver safety score and a driver safety threshold. The processing engine 112 may determine that the driver is in dangerous condition and generate the result of the first comparison being "yes" in response to a determination that the driver safety score is less than the driver safety threshold. In some embodiments, the driver safety threshold may be a default setting of the online to offline service system 100. The driver safety threshold may be adjustable under different situations. For example, the driver safety threshold may be adjusted based on weather condition. The value of the driver safety threshold may be increased in a foggy day than that in a sunny day.

The processing engine 112 may perform a second comparison between the passenger safety score and a passenger safety threshold. The processing engine 112 may determine that the passenger is in dangerous condition and generate the result of the second comparison being "yes" in response to a determination that the passenger safety score is less than the passenger safety threshold. In some embodiments, the passenger safety threshold may be a default setting of the online to offline service system 100. The passenger safety threshold may be adjustable under different situations. For example, the passenger safety threshold may be adjusted based on weather condition. The value of the passenger safety threshold may be increased in a rainy day than that in a sunny day.

The processing engine 112 may perform a third comparison between the abnormality score and an abnormality threshold. The processing engine 112 may determine that an abnormality occurs and generate the result of the third comparison being "yes" in response to a determination that the abnormality score is less than the abnormal safety threshold. In some embodiments, the abnormal safety threshold may be a default setting of the online to offline service system 100. The abnormal safety threshold may be adjustable under different situations. For example, the abnormal safety threshold may be adjusted based on vehicle performance. The value of the abnormal safety threshold may be increased when the vehicle performance is better.

The processing engine 112 may determine the safety score of the service order at the current time based on at least one result of the first comparison, the second comparison, and the third comparison. The safety score of the service order may be used to determine whether a dangerous condition occurs. The processing engine 112 may determine a dangerous condition occurs in response to a determination that at least one of the three results of the comparisons being "yes".

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 900. In the storing operation, the processing engine 112 may store the abnormality score, the abnormality threshold, and/or the results of the first, second and third comparisons in any storage device (e.g., the storage device 160) disclosed elsewhere in the present disclosure.

Figure 10:
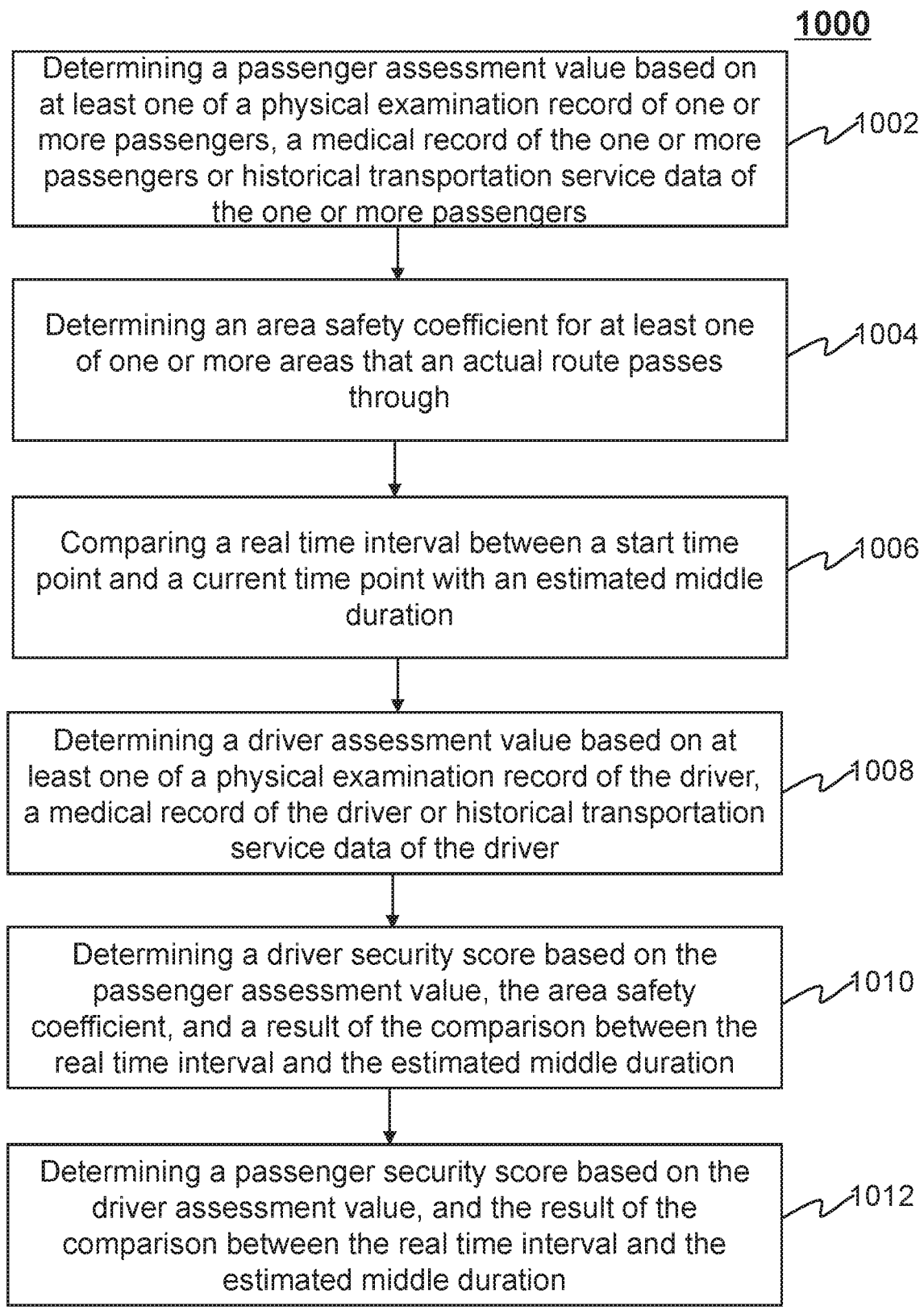
FIG. 10 is a flowchart illustrating an exemplary process 1000 for determining at least one of a plurality of safety scores based on transportation service information and historical data according to some embodiments of the present disclosure.

FIG. 10 is a flowchart illustrating an exemplary process for determining at least one of a plurality of safety scores based on transportation service information and historical data according to some embodiments of the present disclosure. In some embodiments, operation 902 and operation 904 of process 900 may be performed based on the process 1000. The process 1000 may be executed by the on-demand service system 100. For example, the process 1000 may be implemented as a set of instructions (e.g., an application) stored in a storage device (e.g., the storage device 160). The processor 210 and/or the modules in FIG. 4 may execute the set of instructions and, when executing the instructions, the processor 210 and/or the modules may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1002, the processing engine 112 (e.g., the assessment determination module 420) (e.g., the processing circuits 210-*b* of the processor 210) may determine a passenger assessment value based on at least one of a physical examination record of one or more passengers, a medical record of the one or more passengers or historical transportation service data of the one or more passengers. The one or more passengers may be involved in a service order to be assessed. The historical transportation service data of the one or more passengers may include pick-up locations, destinations, ratings, complaints received from drivers, or the like, or any combination thereof.

The processing engine 112 may determine the passenger assessment value based on the historical transportation service data of the one or more passengers based on equation (4).

In some embodiment, the processing engine 112 may decrease the passenger assessment value when at least one of the physiological indexes determined based on the physical examination record of one or more passengers, and the medical record of the one or more passengers is out of a corresponding normal range.

In 1004, the processing engine 112 (e.g., the assessment determination module 420) (e.g., the processing circuits 210-*b* of the processor 210) may determine an area safety coefficient for at least one of one or more areas that an actual route passes through. The one or more areas may be included an administrative area (e.g., a city, a district) or a geographic area (e.g., a national park, a lake). As used herein, the actual route may be at least a portion of a route between a pick-up location and a destination of the service order determined based on a plurality of positions of at least one of the one or more signal transmission devices corresponding to each of a plurality of time points during the service order disclosed in FIG. 8.

The processing engine 112 may determine the area safety coefficient based on regional historical violation and/or criminal records of the one of one or more areas that an actual route passes through, driver's rating by passengers and relative geographical location rating of the one of one or more areas that an actual route passes through. For example, area safety coefficients for areas with violation and/or criminal records are lower than (e.g., 10%) area safety coefficients for areas without violation records. Taking relative geographical location rating as an example, area safety coefficients for geographically rural areas are lower than area safety coefficients for geographically urban areas.

In some embodiments, the processing engine 112 may determine the driver's rating and the relative geographical location rating using a 1 to 5 star rating system. For example, the processing engine 112 may determine a driver's rating of a service order to be 1 star, in response to a determination that a violation happened or the vehicle have not arrived safely during the service order; 2 stars, in response to a determination that the driver complained and rated one or more passengers of the service order with 1 star; 3 stars, in response to a determination that the driver complained and rated the one or more passengers with 2 or 3 stars, 4 stars, in response to a determination that the driver rated the one or more passengers with 4 stars; and 5 stars, in response to a determination that the driver rated the one or more passengers with 5 stars. In addition, the processing engine 112 may also determine the relative geographical location rating using the star rating system as follows: 1 star for extremely rural areas; 2 stars for rural areas; 3 stars for suburban areas outside the county; 4 stars for urban area; 5 stars for downtown area. The processing engine 112 may determine the area safety coefficient as an average value of the above two star ratings. The average may be an arithmetic mean, a geometric mean, a square mean, a harmonic mean, a weighted mean, or the like, or any combination thereof. For example, the processing engine 112 may determine the value of the area safety coefficient to be 4 in response to a determination that the driver's rating being 5 stars and the relative geographical location rating being 3 stars.

In 1006, the processing engine 112 (e.g., the assessment determination module 420) (e.g., the processing circuits 210-*b* of the processor 210) may compare a real time interval between a start time point and a current time point with an estimated middle duration. The start time point may be a time point that the one or more passengers get on the vehicle. The estimated middle duration may correspond to an estimated time interval between the start time point and an end time point that the one or more passengers get off the vehicle.

In 1008, the processing engine 112 (e.g., the assessment determination module 420) (e.g., the processing circuits 210-*b* of the processor 210) may determine a driver assessment value based on at least one of a physical examination record of a driver, a medical record of the driver or historical transportation service data of the driver.

The driver may be involved in the service order to be assessed. The historical transportation service data of the driver may include pick-up locations, destinations, ratings, complaints received from passengers, or the like, or any combination thereof.

The processing engine 112 may determine the driver assessment value based on the historical transportation service data of the driver based on equation (3).

In some embodiments, the processing engine 112 may decrease the driver assessment value when at least one of the physiological indexes determined based on the physical examination record of driver, the medical record of the driver is out of a corresponding normal range.

In 1010, the processing engine 112 (e.g., the score determination module 430) (e.g., the processing circuits 210-*b* of the processor 210) may determine a driver safety score based on the passenger assessment value, the area safety coefficient, and a result of the comparison between the real time interval and the estimated middle duration.

In some embodiments, the processing engine 112 may determine the driver safety score as an average value of the passenger assessment value, the area safety coefficient, and a time difference between the real time interval and the estimated middle duration. The average value may be an arithmetic mean, a geometric mean, a square mean, a harmonic mean, a weighted mean, or the like, or any combination thereof. For example, the processing engine 112 may determine the driver safety score as an arithmetic mean of the passenger assessment value, the area safety coefficient, and the time difference based on equation (1).

In 1012, the processing engine 112 (e.g., the score determination module 430) (e.g., the processing circuits 210-*b* of the processor 210) may determine a passenger safety score based on the driver assessment value, and the result of the comparison between the real time interval and the estimated middle duration.

In some embodiments, the processing engine 112 may determine the passenger safety score as an average value of the driver assessment value, and a time difference between the real time interval and the estimated middle duration. The average value may be an arithmetic mean, a geometric mean, a square mean, a harmonic mean, a weighted mean, or the like, or any combination thereof. For example, the processing engine 112 may determine the driver safety score as an arithmetic mean of the driver assessment value, and the time difference based on equation (2).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 1000. In the storing operation, the processing engine 112 may store the passenger safety score, the driver safety score, the time difference, and/or the area safety coefficient in any storage device (e.g., the storage device 160) disclosed elsewhere in the present disclosure.

Figure 11:
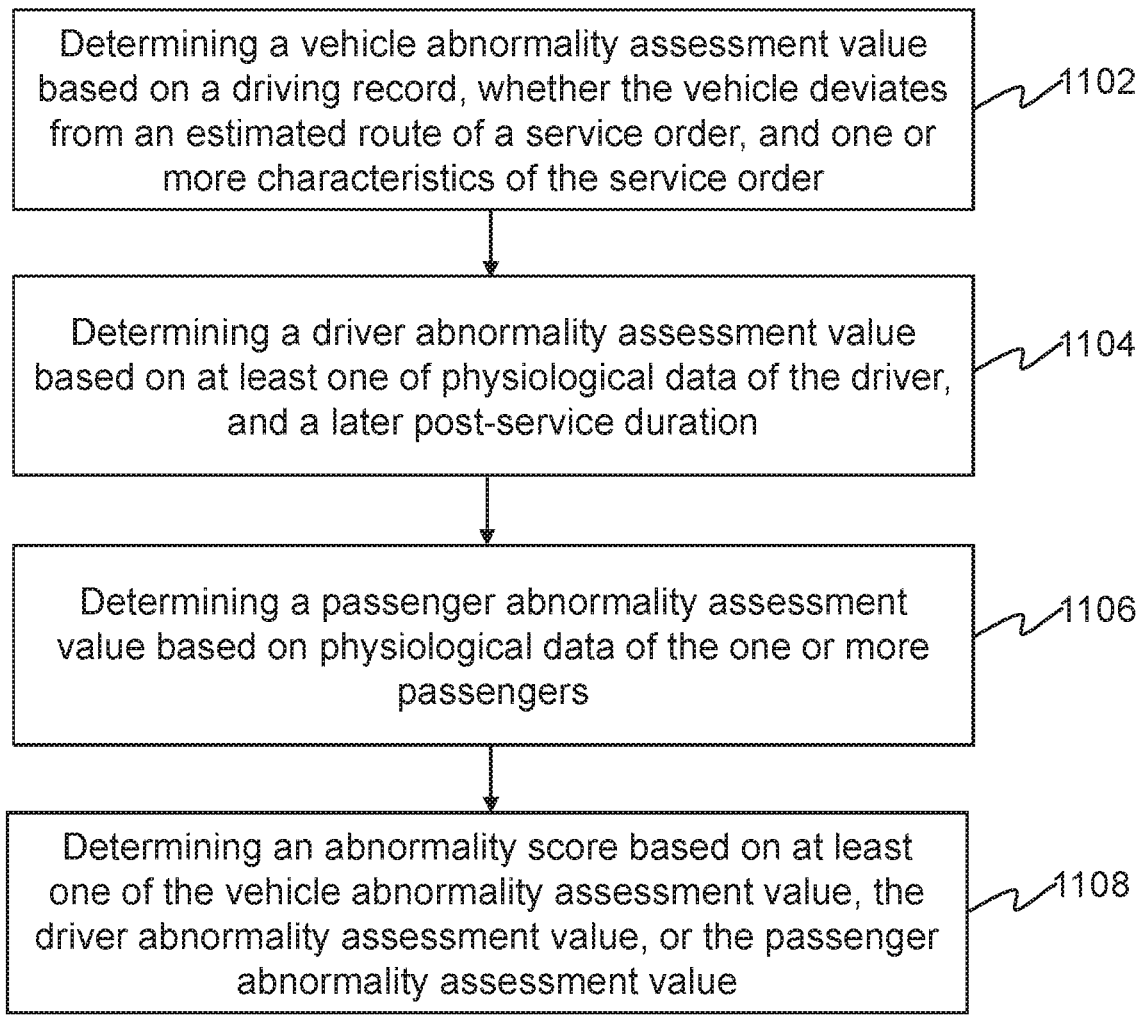
FIG. 11 is a flowchart illustrating an exemplary process 1100 for determining abnormality scores based on transportation service information and historical data according to some embodiments of the present disclosure.

FIG. 11 is a flowchart illustrating an exemplary process for determining abnormality scores based on transportation service information and historical data according to some embodiments of the present disclosure. In some embodiments, operation 906 of process 900 may be performed based on the process 1100. The process 1100 may be executed by the on-demand service system 110. For example, the process 1100 may be implemented as a set of instructions (e.g., an application) stored in a storage device (e.g., the storage device 160). The processor 211 and/or the modules in FIG. 4 may execute the set of instructions and, when executing the instructions, the processor 211 and/or the modules may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1102, the processing engine 112 (e.g., the assessment determination module 420) (e.g., the processing circuits 210-b of the processor 210) may determine a vehicle abnormality assessment value based on a driving record, whether the vehicle deviates from an estimated route of a service order, and one or more characteristics of the service order.

The processing engine 112 may determine the vehicle abnormality assessment value being positively correlated to a dangerous driving assessment value determined based on the driving record, and a result of a comparison determined when the vehicle is observed deviating from the estimated route.

The processing engine 112 may perform a dangerous driving assessment based on acceleration data of the vehicle, where the acceleration data is included in the driving record. The processing engine 112 may receive the driving record from a driver signal transmission device associated with the driver of the service order to be assessed. The driver signal transmission device may obtain the driving record from one or more first sensors associated with the driver. The one or more first sensors may include a velocity sensor, an acceleration sensor, a steering angle sensor, a traction-related sensor, or the like, or any combination thereof.

The processing engine 112 may decrease the dangerous driving assessment value when a dangerous driving action is detected based on the acceleration data of the vehicle. The dangerous driving action may include overspeeding, braking abruptly and frequently, accelerating abruptly and frequently, changing lanes abruptly and frequently, or the like, or any combination thereof. For example, the processing engine 112 may deduce 10 scores from the dangerous driving assessment value (e.g., the maximum score being 100) when a velocity sensed by the velocity sensor is greater than a velocity threshold (e.g., 80 km/h) according to traffic rules.

The processing engine 112 may determine whether the vehicle deviates from the estimated route of the service order based on an actual route of the vehicle and the estimated route. As used herein, the estimated route may be a route between a pick-up location and a destination of the service order determined by the processing engine 112.

The processing engine 112 may determine the actual route of the vehicle based on a plurality of positions of at least one of the one or more signal transmission devices corresponding to each of a plurality of time points during the service order. The descriptions of determining actual route and the plurality of positions of at least one of the one or more signal transmission devices may be found elsewhere in present disclosure (e.g., FIG. 13, and the descriptions thereof).

The processing engine 112 may determine whether the vehicle deviates from the estimated route of the service order by comparing the actual route of the vehicle with the estimated route. In some embodiments, the processing engine 112 may divide the route of the service order (e.g., the actual route, the estimated route) into a plurality of section pairs, wherein each section pair include a section of the actual route and a corresponding section of the estimated route. The processing engine 112 may compare each section pair. The descriptions of an exemplary process for comparing a section pair may be found elsewhere in present disclosure (e.g., FIG. 13, and the descriptions thereof).

Figure 13:
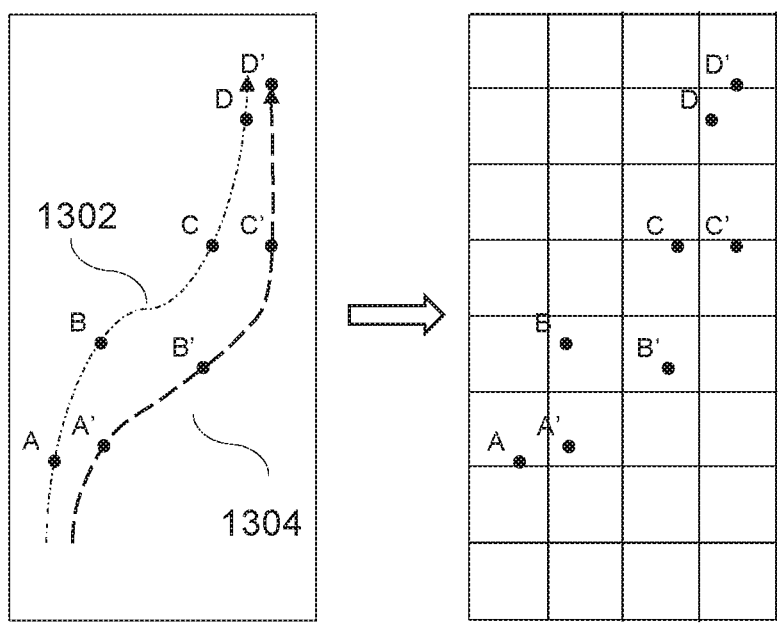
FIG. 13 is a schematic diagram illustrating an exemplary process for comparing a section of an actual route and a corresponding section of an estimated route according to some embodiments of the present disclosure.

FIG. 13 is a schematic diagram illustrating an exemplary process for comparing a section of an actual route and a corresponding section of an estimated route according to some embodiments of the present disclosure. In some embodiments, the processing engine 112 (e.g., the assessment determination module 420) may perform a grid processing for a road scenario. For example, the processing engine 112 may transform the road scenario to a grid map. The grid map includes a plurality of grids. Each grid may represent an area of a road. In some embodiments, the size of each of the plurality of grids in the grid map may be any suitable value, e.g., 11 cm×11 cm, 20 cm×20 cm, 30 cm×30 cm. In some embodiments, the assessment determination module 420 may project a plurality of estimated positions representing a section of the estimated route of a service order 1304 and a plurality of sample positions representing a section of the actual route of the service order 1302 into the grid map. The plurality of sample positions may be obtained from one or more signal transmission devices (e.g., a driver signal transmission device, a passenger signal transmission device, a vehicle signal transmission device) at the plurality of time points, and the plurality of estimated positions may be determined based on the plurality of time points and the estimated route. As shown in FIG. 13, A', B', C', and D' represents the plurality of estimated positions, and A, B, C, and D represents the plurality of sample positions. The processing engine 112 may project the road scenario into the corresponding grid map. It should be understood for persons having ordinary skills in the art that the grid map may number the plurality of grids based on positions of the plurality of grids. In some embodiments, the processing engine 112 may number each grid with a 2-dimensional vector, one element indicating the sequence of the grid in the row, the other element indicating the sequence of the grid in the column.

The processing engine 112 may compare the section of the actual route with the corresponding section of the estimated route by comparing each sample position with the section of the estimated route. For example, the processing engine 112 may determine a result of the comparison as a percentage of sample positions in grids that the estimated route passes through. In some embodiments, the processing engine 112 may compare the section of the actual route with the section of the estimated route by comparing each sample position with a corresponding estimated position. For example, the processing engine 112 may determine a result of the comparison as a percentage of sample positions in the same grids as its corresponding estimated position.

Referring back to FIG. 11, the processing engine 112 may determine a result of the comparison between the actual route the estimated route to evaluate the deviation of the vehicle from the estimated route, by adding results of comparisons of each section pair together and then multiplying the addition result of comparisons by 100. For example, the processing engine 112 may determine the result of the comparison between the actual route and the estimated route as 60, when the addition result of comparisons is 60%.

In some embodiments, the processing engine 112 may further determine the vehicle abnormality assessment value based on the one or more characteristics of the service order. In some embodiments, the one or more characteristics of the service order may include the estimated route of the service order, an estimated middle duration of the service order, a weather condition corresponding to a current time point, or the like, or any combination thereof. For example, the processing engine 112 may determine the vehicle abnormality assessment value based on weather condition corresponding to the current time point. The weather condition may include rain, snow, wind, smog, hail, and any bad weather that may affect the traffic. The processing engine 112 may decrease the vehicle abnormality assessment value when a bad weather occurs.

In 1104, the processing engine 112 (e.g., the assessment determination module 420) (e.g., the processing circuits 210-b of the processor 210) may determine a driver abnormality assessment value based on at least one of the physiological data of the driver, and a post-service duration between an end time point and a time point that the driver accepts a request for a next service order. The descriptions of exemplary post-service duration may be found elsewhere in present disclosure (e.g., FIG. 12, and the descriptions thereof).

The processing engine 112 may decrease the driver abnormality assessment value when at least one of the physiological indexes determined based on the physiological data of the driver is out of a corresponding normal range. The processing engine 112 may determine the driver abnormality assessment value being negatively correlated to a time interval of the post-service duration.

As used herein, the physiological data may include at least one of heart rate, body temperature, or blood pressure. The processing engine 112 may obtain the physiological data of the driver from the driver signal transmission device, wherein the driver signal transmission device obtains the driving record from one or more first sensors associated with the driver. The one or more first sensors may include a heartbeat sensor, a temperature sensor, a blood pressure sensor, or the like, or any combination thereof. The one or more first sensors may be attached to the body of the driver.

In 1106, the processing engine 112 (e.g., the assessment determination module 420) (e.g., the processing circuits 210-b of the processor 210) may determine a passenger abnormality assessment value based on the physiological data of the one or more passengers. The processing engine 112 may decrease the driver abnormality assessment value when at least one of the physiological indexes determined based on the physiological data of the one or more passengers is out of a corresponding normal range. The physiological data of the one or more passengers may be obtained from one or more second sensors, being similar to the physiological data of the driver, and will not be described herein.

In 1108, the processing engine 112 (e.g., the score determination module 430) (e.g., the processing circuits 210-b of the processor 210) may determine an abnormality score based on at least one of the vehicle abnormality assessment value, the driver abnormality assessment value, and the passenger abnormality assessment value.

In some embodiments, the processing engine 112 may determine a dangerous condition occurs once at least one of the physiological indexes (of the driver, and/or of the at least one of the one or more passengers) is out of a corresponding normal range regardless of other information. For example, the processing engine 112 may determine a dangerous condition occurs with respect to the driver, in response to a determination that the driver is having a heart attack. The processing engine 112 may immediately transmit a driver alert signal to the signal transmission device associated with the driver to make an emergency call and a control signal to at least one of the one or more signal transmission devices to stop the motion of the vehicle.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 1100. In the storing operation, the processing engine 112 may store the passenger abnormality assessment value, the driver abnormality assessment value, and/or the vehicle abnormality assessment value in any storage device (e.g., the storage device 160) disclosed elsewhere in the present disclosure.

Figure 14:
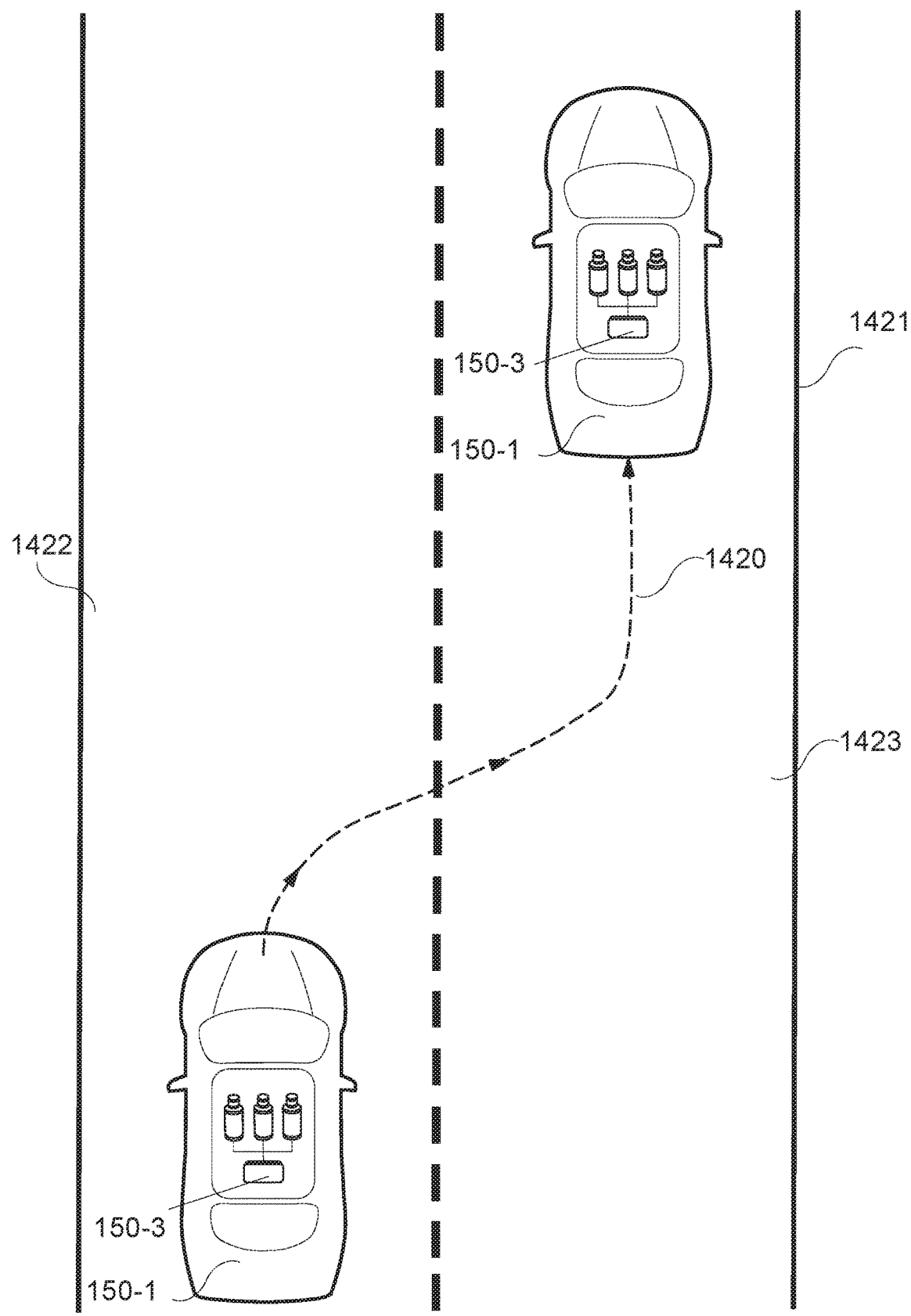
FIG. 14 is a schematic diagram illustrating an exemplary scenario for stopping vehicle according to some embodiments of the present disclosure.

FIG. 14 is a schematic diagram illustrating an exemplary scenario for stopping vehicle according to some embodiments of the present disclosure. As shown in FIG. 14, a vehicle 150-1 may travel along a road 1421 and brake without human input along a path autonomously determined by the vehicle 150-1. The road 1421 may be a space prepared for a vehicle to travel along. For example, the road 1421 may be a road for vehicles with wheel (e.g. a car, a train, a bicycle, a tricycle, etc.). The vehicle 150-1 may be regulated to drive according to the traffic law. For example, speed of the vehicle 150-1 may not exceed speed limit of the road 1421. The road 1421 may include one or more lanes (e.g., lane 1422 and lane 1423). The lane 1423 may include an emergency stop area.

As described in connection with FIG. 1, the plurality of sensors 150-3 may be configured to receive instruction that is used to control the vehicle 150-1. The plurality of sensors 150-3 may further include a control unit. The control unit may be configured to control the vehicle 150-1. The control unit may control the vehicle 150-1 to drive along a driving path 1420. The control unit may determine the driving path 1420 and speed along the driving path 1420 based on status information from the plurality of sensors 150-3. In some embodiments, the driving path 1420 may be used as a designated area for the vehicle 150-1 to stop. For example, the plurality of sensors 150-3 may receive instruction that is used to control the vehicle 150-1 to brake and stop in a designated area.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system, comprising:
   a computer-readable non-transitory storage medium storing executable instructions for assessing transportation service safety; and
   at least one processor in communication with the non-transitory computer-readable storage medium, when executing the executable instructions, the at least one processor is directed to cause the system to:
   receive transportation service data of a service order in an order time duration from one or more signal transmission devices relating to the service order;
   obtain, from a database, historical data relating to a driver of a vehicle of the service order, and one or more passengers of the service order;
   determine, a safety score of the service order at a current time point, based on the historical data, the transportation service data, and one or more characteristics of the service order; and determine whether a dangerous condition occurs at the current time point based on the safety score.

2. The system of claim 1, wherein the processor is further directed to cause the system to:
transmit a signal to at least one of the one or more signal transmission devices, the signal encoding an instruction to the at least one of the one or more signal transmission devices to transmit to the processor, data associated with a scene inside the vehicle, wherein the data including at least one type of video data, audio data, or image data; and
receive the data associated with the scene in the vehicle from the at least one of the one or more signal transmission devices.

3. The system of claim 1, wherein in response to a determination that the dangerous condition occurs at the current time point, the processor is further directed to cause the system to perform at least one of:
transmitting a control signal to at least one of the one or more signal transmission devices to stop motion of the vehicle; or
transmitting an alert signal to a third party requesting the third party to intervene.

4. The system of claim 1, wherein in response to a determination that the dangerous condition occurs at the current time point, the processor is further directed to cause the system to perform at least one of:
transmitting, based on a determination that the dangerous condition occurs with respect to the driver, a driver alert signal to the signal transmission device associated with the driver; or
transmitting, based on a determination that the dangerous condition occurs with respect to the passenger, a passenger alert signal to at least one of the signal transmission devices associated with the one or more passengers.

5. The system of claim 1, wherein to receive transportation service data of a service order in an order time duration from one or more signal transmission devices relating to the service order, the processor is further directed to cause the system to:
receive the transportation service data from the one or more signal transmission devices every five seconds.

6. The system of claim 1, wherein to determine, a safety score of the service order at a current time oointt, based on the historical data, the transportation service data, and one or more characteristics of the service order, the processor is further directed to cause the system to:
determine a driver safety score based on the historical data relating to the one or more passengers, an actual route, an estimated middle duration, and the current time point;
determine a passenger safety score based on the historical data relating to the driver, the estimated middle duration, and the current time point;
determine an abnormality score based on the transportation service data, and the one or more characteristics of the service order; and
determine the safety score of the service order at the current time point based on at least one of the driver safety score, the passenger safety score, or the abnormality score.

7. The system of claim 6, wherein to determine the safety score of the service order at the current time point, the processor is further directed to cause the system to:
perform a first comparison between the driver safety score and a driver safety threshold;
perform a second comparison between the passenger safety score and a passenger safety threshold;
perform a third comparison between the abnormality score and an abnormality threshold; and
determine the safety score of the service order at the current time point based on at least one result of the first comparison, the second comparison, or the third comparison.

8. The system of claim 7, wherein to determine a driver safety score based on the historical data relating to the one or more passengers, the actual route, the estimated middle duration, and the current time point, the processor is further directed to cause the system to:
determine a passenger assessment value based on at least one of a physical examination record of the one or more passengers, medical record of the one or more passengers or the historical transportation service data of the one or more passengers;
determine one or more areas that the actual route passes through;
determine an area safety coefficient for at least one of the one or more areas;
determine a real time interval between the start time point and the current time point;
compare the real time interval with the estimated middle duration; and
determine the driver safety score based on the passenger assessment value, the area safety coefficient, and a result of the comparison between the real time interval and the estimated middle duration.

9. The system of claim 8, wherein to determine a passenger safety score based on the historical data relating to the driver, the estimated middle duration, and the current time point, the processor is further directed to cause the system to:
determine a driver assessment value based on at least one of the physical examination record of the driver, the medical record of the driver or the historical transportation service data of the driver; and
determine the passenger safety score based on the driver assessment value, and the result of the comparison between the real time interval and the estimated middle duration.

10. The system of claim 8, wherein to determine an abnormality score based on the transportation service data, and the one or more characteristics of the service order, the processor is further directed to cause the system to:
determine a vehicle abnormality assessment value based on the driving record, whether the vehicle deviates from the estimated route of the service order, and the one or more characteristics of the service order;
determine a driver abnormality assessment value based on at least one of the physiological data of the driver, and a post-service duration between the end time point and a time point that the driver accepts a request for a next service order;
determine a passenger abnormality assessment value based on the physiological data of the one or more passengers; and
determine the abnormality score based on at least one of the vehicle abnormality assessment value, the driver abnormality assessment value, or the passenger abnormality assessment value.

11. A method implemented on a computing device having at least one processor, at least one storage medium and a communication platform connected to a network, the method comprising:

receiving transportation service data of a service order in an order time duration from one or more signal transmission devices relating to the service order;

obtaining, from a database, historical data relating to a driver of a vehicle of the service order, and one or more passengers of the service order;

determining, a safety score of the service order at a current time point, based on the historical data, the transportation service data, and one or more characteristics of the service order; and determining whether a dangerous condition occurs at the current time point based on the safety score.

12. The method of claim 11, wherein the method further includes:

transmitting a signal to at least one of the one or more signal transmission devices, the signal encoding an instruction to the at least one of the one or more signal transmission devices to transmit to the processor, data associated with a scene inside the vehicle, wherein the data including at least one type of video data, audio data, or image data; and receiving the data associated with the scene in the vehicle from the at least one of the one or more signal transmission devices.

13. The method of claim 11, wherein in response to a determination that a dangerous condition occurs at the current time point, the method further includes at least one of:

transmitting a control signal to at least one of the one or more signal transmission devices to stop motion of the vehicle; or transmitting an alert signal to a third party requesting the third party to intervene.

14. The method of claim 11, wherein in response to a determination that a dangerous condition occurs at the current time oint, the method further includes:

transmitting, based on a determination that the dangerous condition occurs with respect to the driver, a driver alert signal to the signal transmission device associated with the driver; or transmitting, based on a determination that the dangerous condition occurs with respect to the passenger, a passenger alert signal to at least one of the signal transmission devices associated with the one or more passengers.

15. The method of claim 11, wherein the determining, a safety score of the service order at a current time, based on the historical data, the transportation service data, and one or more characteristics of the service order includes:

determining a driver safety score based on the historical data relating to the one or more passengers, an actual route, an estimated middle duration, and the current time point;

determining a passenger safety score based on the historical data relating to the driver, the estimated middle duration, and the current time point;

determining an abnormality score based on the transportation service data, and the one or more characteristics of the service order; and determining the safety score of the service order at a current time point based on at least one of the driver safety score, the passenger safety score, or the abnormality score.

16. The method of claim 15, wherein the determining the safety score of the service order at the current time point includes:

performing a first comparison between the driver safety score and a driver safety threshold;

performing a second comparison between the passenger safety score and a passenger safety threshold;

performing a third comparison between the abnormality score and an abnormality threshold; and determining the safety score of the service order at the current time Doint based on at least one result of the first comparison, the second comparison, or the third comparison.

17. The method of claim 15, wherein the determining a driver safety score based on the historical data relating to the one or more passengers, the actual route, the estimated middle duration, and the current time point includes:

determining a passenger assessment value based on at least one of a physical examination record of the one or more passengers, a medical record of the one or more passengers or the historical transportation service data of the one or more passengers;

determining one or more areas that the actual route passes through;

determining an area safety coefficient for at least one of the one or more areas;

determining a real time interval between the start time point and the current time point;

comparing the real time interval with the estimated middle duration; and determining the driver safety score based on the passenger assessment value, the area safety coefficient, and a result of the comparison between the real time interval and the estimated middle duration.

18. The method of claim 17, wherein the determining a passenger safety score based on the historical data relating to the driver, the estimated middle duration, and the current time point includes:

determining a driver assessment value based on at least one of the physical examination record of the driver, the medical record of the driver or the historical transportation service data of the driver; and determining the passenger safety score based on the driver assessment value, and the result of the comparison between the real time interval and the estimated middle duration.

19. The method of claim 17, wherein the determining an abnormality score based on the transportation service data, and the one or more characteristics of the service order includes:

determining a vehicle abnormality assessment value based on the driving record, whether the vehicle deviates from the estimated route of the service order, and the one or more characteristics of the service order;

determining a driver abnormality assessment value based on at least one of the physiological data of the driver, and a post-service duration between the end time point and a time point that the driver accepts a request for a next service order;

determining a passenger abnormality assessment value based on the physiological data of the one or more passengers; and determining the abnormality score based on at least one of the vehicle abnormality assessment value, the driver abnormality assessment value, or the passenger abnormality assessment value.

20. A non-transitory computer readable medium, comprising at least one set of instructions for assessing transportation service safety, wherein when executed by at least one processor of an electronic terminal, the at least one set of instructions directs the at least one processor to perform acts of:

receiving transportation service data of a service order in an order time duration from one or more signal transmission devices relating to the service order;

obtaining, from a database, historical data relating to a driver of a vehicle of the service order, and one or more passengers of the service order;

determining, a safety score of the service order at a current time point, based on the historical data, the transportation service data, and one or more characteristics of the service order; and determining whether a dangerous condition occurs at the current time point based on the safety score.

* * * * *